United States Patent [19]
Liu et al.

[11] Patent Number: 5,987,554
[45] Date of Patent: Nov. 16, 1999

[54] METHOD OF CONTROLLING THE TRANSFER OF INFORMATION ACROSS AN INTERFACE BETWEEN TWO BUSES

[75] Inventors: Ji-hwan Liu, Cupertino; Ken Nguyen, San Jose; Karl S. Johnson, Palo Alto; Mallikarjunan Mahalingam, Santa Clara, all of Calif.

[73] Assignee: Micron Electronics, Inc., Nampa, Id.

[21] Appl. No.: 08/942,413

[22] Filed: Oct. 1, 1997

Related U.S. Application Data

[60] Provisional application No. 60/046,397, May 13, 1997, provisional application No. 60/047,016, May 13, 1997, provisional application No. 60/046,416, May 13, 1997, provisional application No. 60/046,311, May 13, 1997, and provisional application No. 60/046,491, May 13, 1997.

[51] Int. Cl.⁶ ...................................................... G06F 13/00
[52] U.S. Cl. ......................... 710/129; 710/126; 710/128; 710/52; 710/260
[58] Field of Search ..................................... 395/309, 306, 395/308, 872, 873, 733, 736, 740; 710/129, 126, 128, 52, 53, 260, 263, 267

[56] References Cited

U.S. PATENT DOCUMENTS

| | | | |
|---|---|---|---|
| 4,057,847 | 11/1977 | Lowell et al. | 702/122 |
| 4,449,182 | 5/1984 | Rubinson et al. | 395/880 |
| 4,672,535 | 6/1987 | Katzman et al. | 710/38 |
| 4,707,803 | 11/1987 | Anthony, Jr. et al. | 395/500.46 |
| 4,769,764 | 9/1988 | Levanon | 361/680 |
| 4,835,737 | 5/1989 | Herrig et al. | 710/103 |
| 4,949,245 | 8/1990 | Martin et al. | 395/850 |
| 4,999,787 | 3/1991 | McNally et al. | 710/103 |
| 5,006,961 | 4/1991 | Monico | 361/788 |
| 5,051,720 | 9/1991 | Kittirutsunetorn | 340/310.02 |
| 5,123,017 | 6/1992 | Simpkins et al. | 371/15.1 |
| 5,157,663 | 10/1992 | Major et al. | 371/9.1 |
| 5,210,855 | 5/1993 | Bartol | 710/107 |
| 5,253,348 | 10/1993 | Scalise | 710/113 |

(List continued on next page.)

FOREIGN PATENT DOCUMENTS 0 866 403 A1   9/1998   European Pat. Off. .

OTHER PUBLICATIONS

NetFrame Systems Incorporated, *News Release*, 3 pages, referring to May 9, 1994.
"NetFrame's New High–Availability ClusterServer Systems Avoid Scheduled as well as Unscheduled Downtime."
NetFrame Systems Incorporated, *datasheet*, 2 pages, Feb. 1996.
"NF450FT Network Mainframe."
NetFrame Systems Incorporated, *datasheet*, 9 pages, Mar. 1996.
"NetFrame Cluster Server 8000."
Herr, et al., Linear Technology Magazine, *Design Features*, pp. 21–23, Jun. 1997.
"Hot Swapping the PCI Bus."
"CAN: Technical Overview", NRTT, Ltd. Sep. 23, 1997, 15 pp.

(List continued on next page.)

*Primary Examiner*—Ayaz R. Sheikh
*Assistant Examiner*—Ario Etienne
*Attorney, Agent, or Firm*—Knobbe, Martens, Olson & Bear, LLP

[57] ABSTRACT

A method and apparatus for interfacing buses includes a system interface processor coupled to a first bus and including a command register accessible via a second bus. A request buffer and a response buffer are provided which are accessible via the second bus and coupled to the interface processor. The request buffer can be used to store information to be transmitted from the second bus to the first via the interface processor while the response buffer can be used to store information to be transmitted from the first bus to the second bus via the interface processor. The interface processor may include a status register to indicate the status of the interface controller. The interface controller may also include a command register to receive commands transmitted over the second bus.

6 Claims, 13 Drawing Sheets

U.S. PATENT DOCUMENTS

| | | | |
|---|---|---|---|
| 5,261,094 | 11/1993 | Everson et al. | 395/600 |
| 5,266,838 | 11/1993 | Gerner | 307/19 |
| 5,269,014 | 12/1993 | Yanai et al. | 710/100 |
| 5,272,584 | 12/1993 | Austruy et al. | 361/58 |
| 5,307,354 | 4/1994 | Cramer et al. | 714/4 |
| 5,317,693 | 5/1994 | Cuenod et al. | 710/9 |
| 5,329,625 | 7/1994 | Kannan et al. | 395/275 |
| 5,337,413 | 8/1994 | Lui et al. | 395/275 |
| 5,351,276 | 9/1994 | Doll, Jr. et al. | 379/88.17 |
| 5,379,409 | 1/1995 | Ishikawa | 395/575 |
| 5,386,567 | 1/1995 | Lien et al. | 713/100 |
| 5,404,494 | 4/1995 | Garney | 719/300 |
| 5,432,946 | 7/1995 | Allard et al. | 713/310 |
| 5,440,748 | 8/1995 | Sekine et al. | 713/330 |
| 5,471,617 | 11/1995 | Farrand et al. | 709/100 |
| 5,473,499 | 12/1995 | Weir | 361/58 |
| 5,483,419 | 1/1996 | Kaczeus, Sr. et al. | 361/685 |
| 5,485,607 | 1/1996 | Lomet et al. | 395/600 |
| 5,487,148 | 1/1996 | Komori et al. | 714/4 |
| 5,491,791 | 2/1996 | Glowny et al. | 714/37 |
| 5,493,574 | 2/1996 | McKinley | 714/773 |
| 5,493,666 | 2/1996 | Fitch | 711/118 |
| 5,513,314 | 4/1996 | Kandasamy et al. | 714/6 |
| 5,517,646 | 5/1996 | Piccirillo et al. | 713/1 |
| 5,526,289 | 6/1996 | Dinh et al. | 364/557 |
| 5,528,409 | 6/1996 | Cucci et al. | 359/171 |
| 5,533,198 | 7/1996 | Thorson | 709/239 |
| 5,539,883 | 7/1996 | Allon et al. | 709/105 |
| 5,546,272 | 8/1996 | Moss et al. | 361/687 |
| 5,555,510 | 9/1996 | Verseput et al. | 710/102 |
| 5,559,764 | 9/1996 | Chen et al. | 396/30 |
| 5,559,958 | 9/1996 | Farrand et al. | 714/27 |
| 5,559,965 | 9/1996 | Oztaskin et al. | 710/104 |
| 5,564,024 | 10/1996 | Pemberton | 395/283 |
| 5,568,610 | 10/1996 | Brown | 714/48 |
| 5,568,619 | 10/1996 | Blackledge et al. | 710/101 |
| 5,572,403 | 11/1996 | Mills | 361/695 |
| 5,577,205 | 11/1996 | Hwang et al. | 361/683 |
| 5,579,491 | 11/1996 | Jeffries et al. | 710/103 |
| 5,581,712 | 12/1996 | Herrman | 710/103 |
| 5,581,714 | 12/1996 | Amini et al. | 710/128 |
| 5,588,144 | 12/1996 | Inoue et al. | 713/500 |
| 5,592,610 | 1/1997 | Chittor | 714/4 |
| 5,598,407 | 1/1997 | Bud et al. | 370/330 |
| 5,604,873 | 2/1997 | Fite et al. | 395/283 |
| 5,606,672 | 2/1997 | Wade | 710/128 |
| 5,608,876 | 3/1997 | Cohen et al. | 395/281 |
| 5,615,207 | 3/1997 | Gephardt et al. | 370/237 |
| 5,621,159 | 4/1997 | Brown et al. | 73/9 |
| 5,621,892 | 4/1997 | Cook | 709/224 |
| 5,622,221 | 4/1997 | Genga, Jr. et al. | 165/208 |
| 5,632,021 | 5/1997 | Jennings et al. | 710/129 |
| 5,638,289 | 6/1997 | Yamada et al. | 395/500.18 |
| 5,644,470 | 7/1997 | Benedict et al. | 361/686 |
| 5,644,731 | 7/1997 | Liencres et al. | 395/283 |
| 5,651,006 | 7/1997 | Fujino et al. | 370/408 |
| 5,652,832 | 7/1997 | Kane et al. | 714/2 |
| 5,652,892 | 7/1997 | Ugajin | 713/380 |
| 5,655,081 | 8/1997 | Bonnell et al. | 709/202 |
| 5,655,148 | 8/1997 | Richman et al. | 710/8 |
| 5,659,682 | 8/1997 | Devarakonda et al. | 714/47 |
| 5,664,119 | 9/1997 | Jeffries et al. | 710/103 |
| 5,666,538 | 9/1997 | DeNicola | 713/320 |
| 5,671,371 | 9/1997 | Kondo et al. | 710/120 |
| 5,675,723 | 10/1997 | Ekrot et al. | 714/4 |
| 5,680,288 | 10/1997 | Carey et al. | 361/118 |
| 5,684,671 | 11/1997 | Hobbs et al. | 361/683 |
| 5,689,637 | 11/1997 | Johnson et al. | 714/46 |
| 5,692,947 | 12/1997 | Kellum et al. | 451/41 |
| 5,696,899 | 12/1997 | Kalwitz | 709/228 |
| 5,696,970 | 12/1997 | Sandage et al. | 709/301 |
| 5,724,529 | 3/1998 | Smith et al. | 710/129 |
| 5,726,506 | 3/1998 | Wood | 307/147 |
| 5,737,718 | 4/1998 | Grob et al. | 455/557 |
| 5,740,378 | 4/1998 | Rehl et al. | 710/103 |
| 5,742,833 | 4/1998 | Dea et al. | 713/323 |
| 5,747,889 | 5/1998 | Raynham et al. | 307/80 |
| 5,748,426 | 5/1998 | Bedingfield et al. | 361/58 |
| 5,752,164 | 5/1998 | Jones | 455/33.1 |
| 5,754,797 | 5/1998 | Takahashi | 710/103 |
| 5,761,033 | 6/1998 | Wilhelm | 361/686 |
| 5,761,045 | 6/1998 | Olson et al. | 361/726 |
| 5,761,462 | 6/1998 | Neal et al. | 710/129 |
| 5,764,968 | 6/1998 | Nimomiya | 395/560 |
| 5,765,008 | 6/1998 | Desai et al. | 710/101 |
| 5,765,198 | 6/1998 | McCrocklin et al. | 711/165 |
| 5,768,541 | 6/1998 | Pan-Ratzlaff | 710/103 |
| 5,768,542 | 6/1998 | Enstrom et al. | 710/104 |
| 5,774,741 | 6/1998 | Choi | 710/2 |
| 5,778,197 | 7/1998 | Dunham | 710/104 |
| 5,781,703 | 7/1998 | Desai et al. | 706/50 |
| 5,781,767 | 7/1998 | Inoue et al. | 713/500 |
| 5,781,798 | 7/1998 | Beatty et al. | 710/10 |
| 5,784,576 | 7/1998 | Guthrie et al. | 710/103 |
| 5,787,459 | 7/1998 | Stallmo et al. | 711/112 |
| 5,790,775 | 8/1998 | Marks et al. | 714/9 |
| 5,790,831 | 8/1998 | Lin et al. | 710/103 |
| 5,793,987 | 8/1998 | Quackenbush et al. | 710/100 |
| 5,794,035 | 8/1998 | Golub et al. | 709/104 |
| 5,796,185 | 8/1998 | Takata et al. | 307/140 |
| 5,796,580 | 8/1998 | Komatsu et al. | 361/687 |
| 5,796,981 | 8/1998 | Abudayyeh et al. | 395/500.48 |
| 5,798,828 | 8/1998 | Thomas et al. | 356/414 R |
| 5,799,036 | 8/1998 | Staples | 375/222 |
| 5,801,921 | 9/1998 | Miller | 361/686 |
| 5,802,269 | 9/1998 | Poisner et al. | 714/44 |
| 5,802,305 | 9/1998 | McKaughan et al. | 109/227 |
| 5,802,324 | 9/1998 | Wunderlich et al. | 710/101 |
| 5,802,393 | 9/1998 | Begun et al. | 710/10 |
| 5,802,552 | 9/1998 | Fandrich et al. | 711/103 |
| 5,803,357 | 9/1998 | Lakin | 236/78 B |
| 5,805,834 | 9/1998 | McKinley et al. | 710/103 |
| 5,809,224 | 9/1998 | Schultz et al. | 714/7 |
| 5,812,748 | 9/1998 | Ohran et al. | 114/4 |
| 5,812,750 | 9/1998 | Dev et al. | 714/4 |
| 5,812,757 | 9/1998 | Okamoto et al. | 714/11 |
| 5,812,858 | 9/1998 | Nookala et al. | 710/260 |
| 5,815,117 | 9/1998 | Kolanek | 342/442 |
| 5,815,652 | 9/1998 | Ote et al. | 714/31 |
| 5,821,596 | 10/1998 | Miu et al. | 257/419 |
| 5,822,547 | 10/1998 | Boesch et al. | 710/103 |
| 5,835,719 | 11/1998 | Gibson et al. | 709/221 |
| 5,835,738 | 11/1998 | Blackledge, Jr. et al. | 710/127 |
| 5,838,932 | 11/1998 | Alzien | 710/128 |
| 5,841,991 | 11/1998 | Russell | 709/221 |
| 5,852,720 | 12/1998 | Gready et al. | 709/217 |
| 5,852,724 | 12/1998 | Glenn, II et al. | 709/239 |
| 5,857,074 | 1/1999 | Johnson | 709/217 |
| 5,864,653 | 1/1999 | Tavallaei et al. | 315/181 |
| 5,875,310 | 2/1999 | Buckland et al. | 710/126 |
| 5,878,238 | 3/1999 | Gan et al. | 710/128 |
| 5,881,311 | 3/1999 | Woods | 710/4 |

OTHER PUBLICATIONS

M.J. Schofield, "Controller Area Network—How CAN Works", mschofield@cix.compulink.co.uk, Sep. 23, 1997, 4 pp.

"DECchip 21050 PCI–to–PCI Bridge Data Sheet Update", Digital Equipment Corporation, Jun. 1994.

"Detailed Overview of the PC Card Standard", www.pc–card.com/stand_overview.htmml#1, Sep. 30, 1997, 9 pp.

Goble, et al., "Intelligent I/O Architecture I$_2$O", Jun. 1996, 22 pp.

Lockareff, "Lonworks—An Introduction", HTI News, Dec. 1996, 2 pp.

Goodrum, "PCI bus Hot Plug Specification", PCI SIG Membership, Jun. 15, 1997, 29 pp.

Compaq Computer Corporation "Plug and Play BIOS Specification", Version 1.0A, May 5, 1994, 56 pp.

Microsoft Corporation, "Supporting Removable Devices Under Windows and Windows NT", Sep. 15, 1997, 4 pp.

NetFrame Systems, Inc. News Release/Brochures, 14 pp.

& 1

METHOD OF CONTROLLING THE TRANSFER OF INFORMATION ACROSS AN INTERFACE BETWEEN TWO BUSES

RELATED APPLICATIONS

The subject matter of U.S. patent application entitled "Apparatus for Interfacing Buses", filed on Oct. 1, 1997, application Ser. No. 08/942,382, and having attorney Docket No. MNFRAME.012A is related to this application.

PRIORITY CLAIM

The benefit under 35 U.S.C. § 119(e) of the following U.S. provisional application(s) is hereby claimed:

| Title | Application No. | Filing Date |
|---|---|---|
| "Remote Access and Control of Environmental Management System" | 60/046,397 | May 13, 1997 |
| "Hardware and Software Architecture for Inter-Connecting an Environmental Management System with a Remote Interface" | 60/047,016 | May 13, 1997 |
| "Self Management Protocol for a Fly-By-Wire Service Processor" | 60/046,416 | May 13, 1997 |
| "Hot Plug Software Architecture for Off the Shelf Operating Systems" | 60/046,311 | May 13, 1997 |
| "Means for Allowing Two or More Network Interface Controller Cards to Appear as One Card to an Operating System" | 60/046,491 | May 13, 1997 |

APPENDICES

Appendix A, which forms a part of this disclosure, is a list of commonly owned copending U.S. patent applications. Each one of the applications listed in Appendix A is hereby incorporated herein in its entirety by reference thereto.

COPYRIGHT RIGHTS

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The invention relates to interfaces between communication buses in electronic systems. Additionally, the invention relates to an interface between two buses in a computer system.

2. Description of the Related Technology

In the electronics industry, and more particularly in the computer industry, various bus architectures are used to permit parts of computer systems, multiple processors, and controllers to communicate. However, different bus architectures which are governed by different standards are frequently used within a single overall system. Therefore, there is a continuing need to develop interface methods and systems to permit communication between different buses.

One such bus architecture is the Inter-IC control bus ($I^2C$ bus). The $I^2C$ bus is a bi-directional two-wire bus (a serial data line and a serial clock line). Advantages of the $I^2C$ bus architecture are that it provides flexibility and lowers interconnecting costs by reducing board space and pin count. The $I^2C$ bus has particular application in video cards for computer systems and electronic components such as television tuners, AM/FM tuners, video decoders, video encoders, television audio decoders and video cross bars).

Another common bus architecture is the Industry Standard Architecture (ISA bus). The ISA bus is commonly used in computer systems to transfer data to and from the central processing unit or units.

There is a need for a method and apparatus for interfacing an $I^2C$ with an ISA bus. Such an interface would permit a CPU in a computer system to communicate with devices interconnected over an $I^2C$ bus.

SUMMARY OF THE INVENTION

The invention addresses the above and other needs by providing an interface apparatus and method, which in one embodiment includes a system interface processor coupled to a first bus and including a command register accessible via a second bus. A request buffer and a response buffer are provided which are accessible via the second bus and coupled to the interface processor. The request buffer can be used to store information to be transmitted from the second bus to the first via the interface processor while the response buffer can be sued to store information to be transmitted from the first bus to the second bus via the interface processor. The interface processor may include a status register to indicate the status of the interface controller. The interface controller may also include a command register to receive commands transmitted over the second bus.

DETAILED DESCRIPTION OF THE INVENTION

The invention will be described in terms of exemplary embodiments adapted to operate with particular computer systems. However, it will be clear to those skilled in the art that the principles of the invention can be utilized in other computer systems where it is desired to provide an interface between buses. The exemplary embodiments are described below in further detail with reference to the Figures, wherein like elements are referenced by like numerals throughout.

One specific environment in which the invention can be utilized is described in application Ser. No. 08/942,402, entitled "Diagnostic and Managing Distributed Processor System" and application Ser. No. 08/942,168, entitled "Method for Automatically Reporting a System Failure in a Server", which are incorporated herein by reference above and is described below in general terms in order to provide the reader with an example of a specific application of the invention. However, the invention can be utilized in various other systems.

Figure 1:
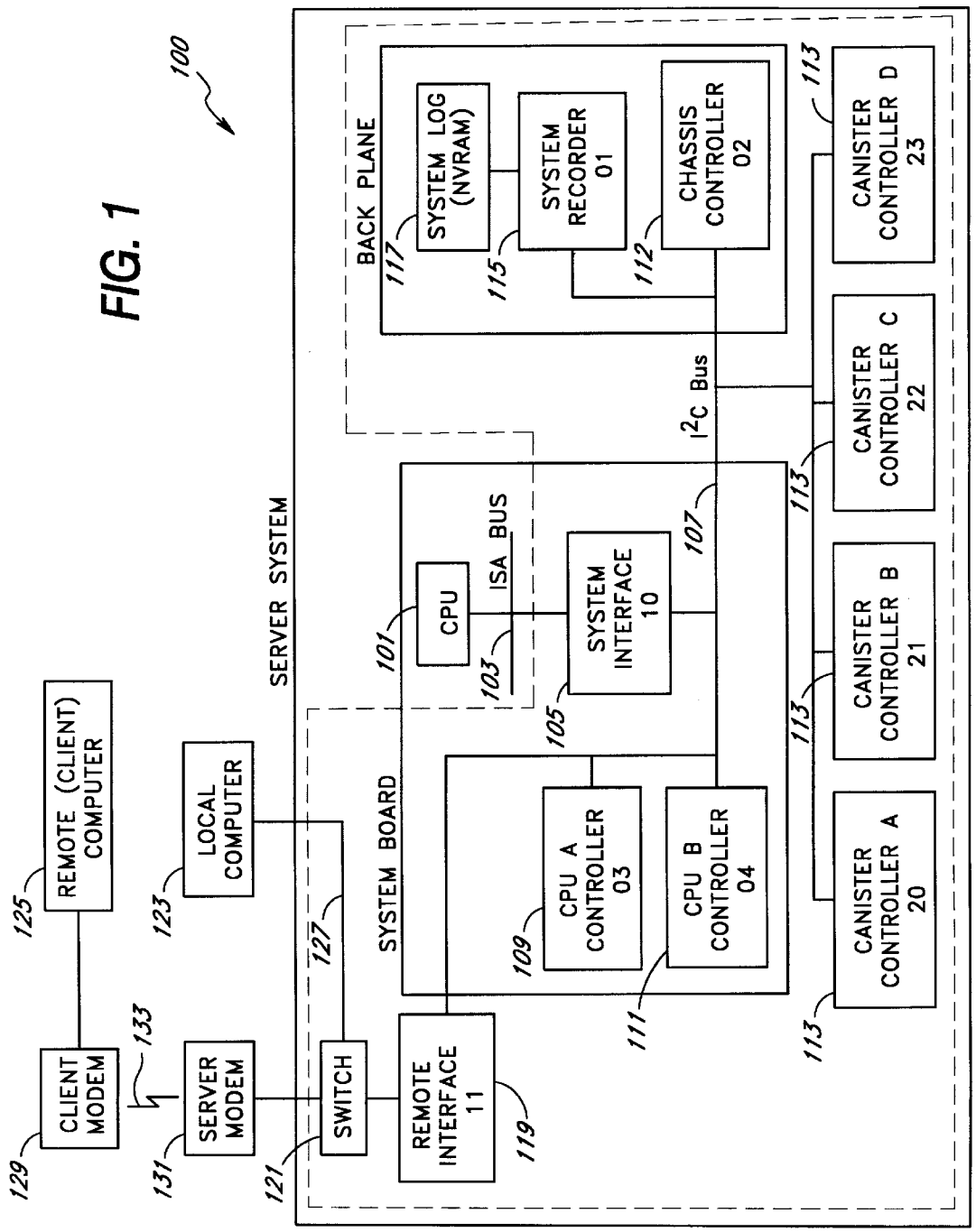
FIG. 1 is a block diagram of a computer system employing an embodiment of the invention.

Referring to FIG. 1, a block diagram of an embodiment of a server system 100 is illustrated. The server system 100 may include a central processing unit (CPU) 101 which executes the operating system (OS) software which controls the communications protocol of the server system 100. The CPU 101 is coupled to an Industry Standard Architecture bus (ISA bus) 103 which transfers data to and from the CPU 101. The ISA bus 103 and its functionality are well-known in the art. Coupled to the ISA bus 103 is a system interface 105 which provides an interface between the ISA bus and an $I^2C$ bus 107. The interface 105 acts as an interface between the ISA bus and an $I^2C$ bus which couples a group of microcontrollers that monitor and control various subsystems and components of the server system 100. As described in further detail below, a message such as an event message sent to the system interface 105 may indicate that a system failure or error has occurred. Additionally, other information including date, queries and commands may be sent across the system interface 105. As used herein, the term "event" may refer to the occurrence of any type of system failure or warning. The structure and functionality of the system interface 105 is described in greater detail below with respect to FIG. 2.

Coupled to the system interface 105 is a system bus 107. In one embodiment, the system bus 111 is an Inter-IC control bus ($I^2C$ bus), which transfers data to and from the various controllers and subsystems mentioned above. The command, diagnostic, monitoring, and logging functions of the failure reporting system of the invention may be accessed through the common $I^2C$ bus protocol. The $I^2C$ bus protocol uses a slave address as the means of identifying the devices on the bus. Any function can be queried by generating a "read" request, which has its address as part of its protocol format. Conversely, a function can be executed by "writing" to an address specified in the protocol format. Any controller or processor connected to the bus can initiate read and write requests by sending a message on the $I^2C$ bus to the processor responsible for that function.

Coupled to the system bus 107 is a CPU A controller 109, a CPU B controller 111, a chassis controller 112 and four canister controllers 113. These controllers monitor and control various operating parameters and/or conditions of the subsystems and components of the server system 100. For example, CPU A controller 109 may monitor the system fan speeds, CPU B controller 111 may monitor the operating temperature of the CPU 101, the chassis controller 112 may monitor the presence of various circuit boards and components of the server system, and each of the canister controllers 112 may monitor the presence and other operating conditions of "canisters" connected to the server system 100. A "cannister" is a detachable module which provides the ability to expand the number of peripheral component interface (PCI) devices that may be integrated into the server system 100. Each canister is capable of providing I/O slots for up to four PCI cards, each capable of controlling and arbitrating access to a PCI device, such as a CD ROM disk drive, for example. If one or more of the various controllers detects a failure, the respective controller sends an event message to the system interface 105 which subsequently reports the occurrence of the event to the CPU 101. In one embodiment, the controllers 109, 111 and 113 and PIC16C65 microcontroller chips manufactured by Microchip Technologies, Inc. and the chassis controller 112 is a PIC16C74 microcontroller chip manufactured by Microchip Technologies, Inc.

Upon detecting a failure condition, a controller (109, 111, 112 or 113) not only transmits an event message to the system interface 105, but also transmits failure information associated with the failure condition to a system recorder 115 connected to the system bus 107. The system recorder 115 then assigns a time stamp to the failure information and logs the failure by storing the failure information, along with its time stamp, into a system log 117. The operation and functionality of the system recorder 115 is described in further detail below with reference to FIG. 6. In one embodiment, the system log 117 is a non-volatile random access memory (NVRAM), which is well-known for its characteristics in maintaining the integrity of data stored within it, even when power to the memory cells is cut off for extended periods of time as a result of a system shut-down or power failure. The following are examples of various monitoring functions performed by some of the controllers described above. However, it is understood that the invention is not limited to these monitoring functions which serve only as examples.

For example, the controller 109 may be coupled to a system fan unit (not shown) and periodically monitor the speed of the fan. In one embodiment, the fan unit transmits a pulse wave form to the controller 109, the frequency of which is proportional to the rate of rotation of the fan. The controller 107 checks the frequency of the pulse wave form on a periodic basis and determines whether the frequency is within a specified range of acceptable fan speeds. If a measured frequency is too slow, the controller 109 detects a fan failure condition and sends an event message to the system interface 105. The controller 109 also sends failure information to the system recorder 115 which assigns a time value to the failure information and stores the failure information with its time stamp into the system log 117. After the system interface 105 receives an event message, it reports the occurrence of the event to the CPU 101.

As another example, the controller 111 may monitor a system temperature parameter. For example, a temperature sensor (not shown) may be coupled to the CPU 101 for monitoring its operating temperature. In one embodiment, the temperature sensor generates a voltage which is proportional to a measured operating temperature of the CPU 101. This voltage may then be converted by well-known means into a digital data signal and subsequently transmitted to the controller 109. The controller 111 then determines whether the measured temperature falls within specified limits. If the measured temperature is either too low or too high, a temperature failure condition is detected and an event message is transmitted to the system interface 105 which subsequently reports the event to CPU 101 and an entry is written to the system log 117 by the system recorder 115.

In another embodiment, multiple temperature sensors (not shown) are coupled to a temperature bus (not shown). The temperature readings of all the sensors on the temperature bus are monitored every second and are read by temperature transducers connected to the chasis controller 112. These sensors are read in address order. The criteria for detecting a temperature fault is provided by three temperature limits: a shutdown limit, which is initialized to 70° C.; and two warning limits, which are initialized to 55° C. and −25° C. Each sensor is compared to the shutdown limit. If any temperature exceeds this limit, the system is powered off. However, each sensor is first compared to the warning limit. If any temperature exceeds this limit, an over-limit fault is created, a temperature LED is set, a temperature event message is sent to the system interface 105, and an entry is written to the system log 117 by the system recorder 115.

The chassis controller 112 can monitor the presence of power supplies, for example. In one embodiment, power supplies may be detected and identified by a signal line coupling each power supply to a one-wire serial bus which is in turn connected to a serial number chip for identifying the serial number of each power supply. In order to detect the presence of a power supply, a reset pulse may be sent by controller 112 to detect a power supply presence pulse. If there is a change in the presence of a power supply, a presence bit is updated and a power supply event is sent to the system interface 105. The power supply data is then written to the system log 117. If a power supply is removed from the system, no further action takes place. The length of the serial number string for that power supply address is set to zero. However, if a power supply is installed, its serial number is read by the one-wire protocol and written to the system log 117.

As shown in FIG. 1, the server system 100 further may include a remote interface 119 also connected to the system bus 107. The remote interface 119 also receives event messages from the various controllers 109, 111, 112 and/or 113 when a failure condition has been detected. The remote interface 119 is a link to the server system 100 for a remote user or client. The term "client" is used to refer to a software program. In one embodiment, the remote interface 119 encapsulates messages in a transmission packet to provide error-free communications and link security. This method establishes a communication protocol in which data is transmitted to and from the remote interface 119 by using a serial communication protocol known as "byte stuffing." In this communication method, certain byte values in the data stream always have a particular meaning. For example, a certain byte value may indicate the start or end of a message, an interrupt signal, or any other command. A byte value may indicate the type or status of a message, or even be the message itself.

Through the remove interface 119, a failure condition may be reported to a local system operator or to a remote operator. As used herein, the term "local" refers to a computer, system, operator or user that is not located in the same room as the hardware of the server system 100 but may be located nearby in a different room of the same building or a different building of the same campus, for example. The term "remote" refers to a computer, system or operator that may be located in another city or state, for example, and is connected to the server system via a modem-to-modem connection. The remote operator is typically a client who is authorized to access data and information from the server system 100 through a remote computer 125.

Coupled to the remote interface 119 is a switch 121 for switching connectivity to the remote interface 119 between a local computer 123 and a remote computer 125. As shown in FIG. 1, the local computer 123 is connected to the remote interface 119 via a local communications line 127. The local communications line 127 may be any type of communication line, e.g., an RS232 line, suitable for transmitting data. The remote computer 125 is connected to the remote interface via a modem-to-modem connection established by a client modem 129 coupled to a server modem 131. The client modem 129 is connected to the server modem 131 by a telephone line 133.

The system interface 105, the system bus 107, the controllers 109, 111, 112 and 113, the system recorder 115, the system log 117, and the remote interface 119 are part of a network of controllers and processors which form the failure reporting system of the invention. In FIG. 1, the failure reporting system can be seen as the blocks surrounded by the dashed lines. The failure reporting system monitors the status and operational parameters of the various subsystems of the server system 100 and provides system failure and error reports to a CPU 101 of the server system 100. Upon being notified of a system event, the CPU 101 executes a software program which allows a system operator to access further information regarding the system failure condition and thereafter take appropriate steps to remedy the situation.

Figure 2:
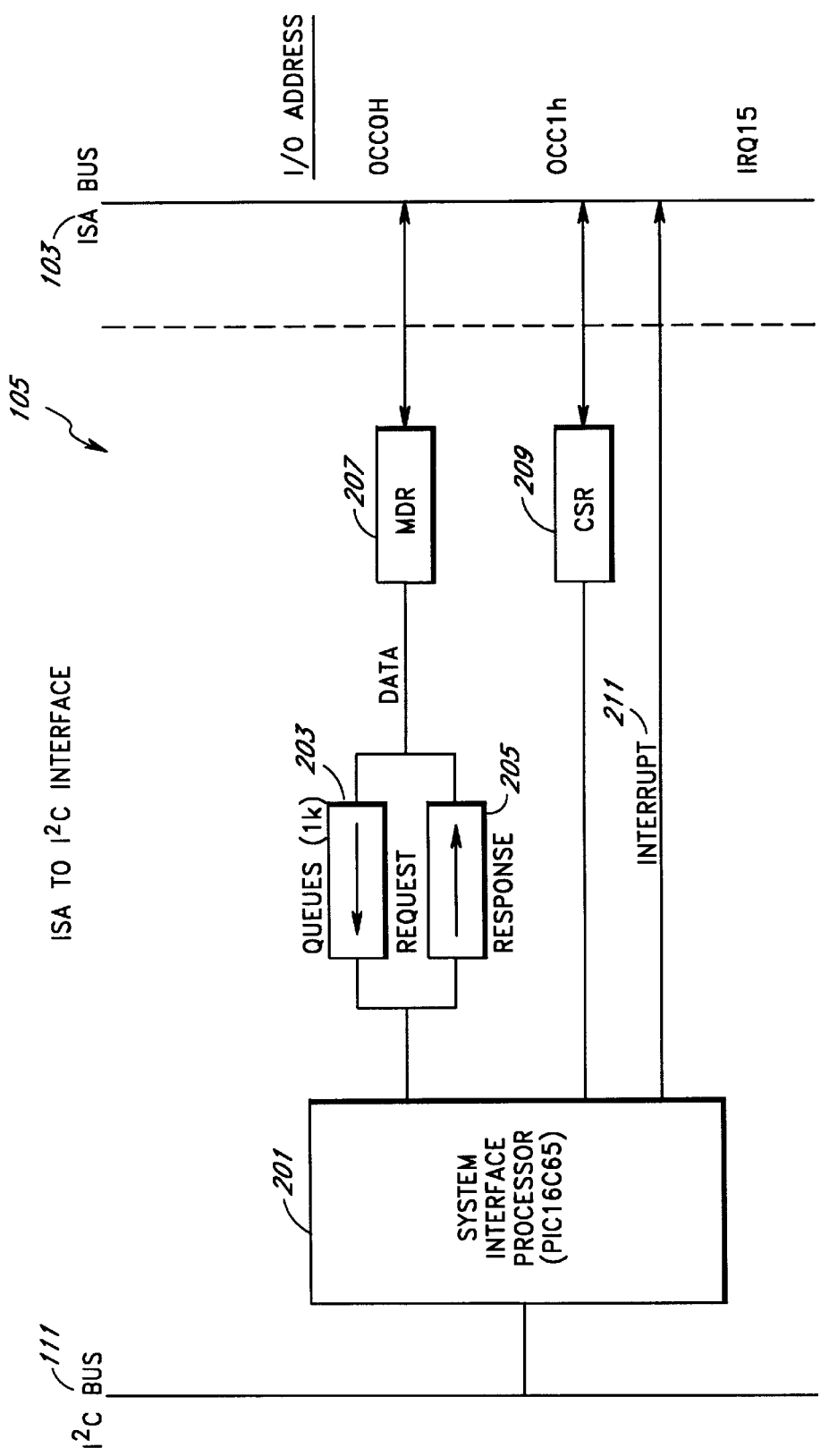
FIG. 2 is a system block diagram of one embodiment of a system interface in accordance with the invention.

Referring to FIG. 2, a block diagram of one embodiment of the system interface 105 is shown surrounded by dashed lines. The system interface 105 provides the interface between the ISA bus and the I$^2$C bus. For example, a system operator can access failure information related to a detected system failure or send commands to devices or the I$^2$C bus by means of the system interface 105. The operating system of the CPU 101 may be an operating system (OS), such as Windows® NT or Netware®, for example.

The system interface 105 may include a system interface processor 201 which receives event and request messages, processes these messages, and transmits command, status and response messages to the ISA bus and thereby to the operating system of the CPU 101. In one embodiment, the system interface processor 201 is a PIC16C65 controller chip manufactured by Microchip Technology, Inc. which includes an event memory (not shown) organized as a bit vector, having at least sixteen bits. Each bit in the bit vector represents a particular type of event. Writing an event to the system interface processor 201 sets a bit in the bit vector that represents the event. Upon receiving an event message from the controller 109 (FIG. 1), for example, the system interface 105 sends an interrupt to the CPU 101 via the ISA bus. Upon receiving the interrupt, the CPU 101 will check the status of the system interface 105 in order to ascertain that an event is pending. Alternatively, the CPU 101 may periodically poll the status of the system interface 105 in order to ascertain whether an event is pending. The CPU 101 may then read the bit vector in the system interface processor 201 to ascertain the type of event that occurred and thereafter notify a system operator of the event by displaying an event message on a monitor coupled to the CPU 101. After the system operator has been notified of the event, as described above, he or she may then obtain further information about the system failure which generated the event message by accessing the system log 117.

The system interface 105 communicates with the CPU 101 by receiving request messages from the CPU 101 and sending response messages back to the CPU 101. Furthermore, the system interface 105 can send and receive status and command messages to and from the CPU 101. For example, a request message may be sent from a system operator enquiring as to whether the system interface 105 has received any event messages, or enquiring as to the status of a particular processor, subsystem operating parameter, etc. A request buffer 203 is coupled to the system interface processor 201 and stores, or queues request data in the order that they are received. Similarly, a response buffer 205 is coupled to the system interface processor 201 and queues outgoing response data in the order that they are received. Collectively the request buffer 203 and the response buffer 205 are referred to as the message data register (MDR) 207. In one embodiment, the MDR 207 is eight bits wide and has a fixed address on the ISA bus which may be accessed by the server's operating system via the ISA bus 103 coupled to the MDR 207. As shown in FIG. 2, the MDR 207 has an I/O address (on the ISA bus) of 0CC0h. "Reads" to that address access the response buffer 205 while "writes" to that address access the request buffer 203.

The system interface 105 may further include a command register and a status register which are collectively referred to as the command status register (CSR) 209 which controls operations and reports on the status of commands. In one embodiment the CSR has an I/O address (on the ISA bus) of 0CC1h and is eight bits wide. Reads to that address access the status register and writes to that address access the command register. The operation and functionality of CSR 209 are described in further detail below.

Both synchronous and asynchronous I/O modes are provided by the system interface 105. Thus, an interrupt line 211 is coupled between the system interface processor 201 and the ISA bus 103 and provides the ability to request an interrupt when asynchronous I/O is complete, or when an event occurs while the interrupt is enabled. As shown in FIG. 2, in one embodiment, the address of the interrupt line 211 is fixed and indicated as IRQ 15 which is an interrupt address number used specifically for the ISA bus 103.

The MDR 207 and the request and response buffers 203 and 205, respectively, transfer messages between a system operator or client and one or more as of the microcontrollers on the I$^2$C bus. The buffers 203 and 205 may utilize the first-in first-out (FIFO) technique. That is, the next message processed is the one that has been in the queue the longest time. The buffers 203 and 205 have two functions: (1) they match speeds between the high-speed ISA bus 103 and the slower system bus 107 (FIG. 1); and (2) they serve as interim buffers for the transfer of messages—this relieves the system interface processor 201 of having to provide this buffer.

When the MDR 207 is written to via the ISA bus 103, it loads a byte into the request buffer 203. When the MDR 207 is read from via the ISA bus 203, it unloads a byte from the response buffer 205. The system interface processor 201 reads and executes the request from the request buffer 203 when a message command is received in the CSR 209. A response message is written to the response buffer 205 when the system interface processor 201 completes executing the command. The system operator or client can read and write message data to and from the buffers 203 and 205 by executing read and write instructions to the MDR 207 via the ISA bus.

The CSR 209 has two functions. The first is to issue commands, and the second is to report on the status of the execution of a command. The system interface 105 commands are usually executed synchronously. That is, after issuing a command, the client polls the CSR status to confirm command completion. In addition to synchronous I/O mode, the client can also request an asynchronous I/O mode for each command by setting a "Asyn Req" bit in the command. In this mode, an interrupt is generated and sent to the ISA bus 103, via the interrupt line 211, after execution of the command has been completed.

The interrupt line 211 may use an ISA IRQ 15 protocol, as mentioned above, which is well-known in the art. Alternatively, the interrupt line 211 may utilize a level-triggered protocol A level-triggered interrupt request is recognized by keeping the message at the same level, or changing the level of a signal, to send an interrupt. In contrast, an edge-triggered interrupt, for example, is recognized by the signal level transition. A client can either enable or disable the level-triggered interrupt by sending "Enable Ints" and "Disable Ints" commands. If the interrupt line is enabled, the system interface processor sends an interrupt signal to the ISA bus 103, either when an asynchronous I/O is complete or when an event has been detected.

In the embodiment shown in FIG. 2, the system interface 105 may be a single-threaded interface. That is, only one client, or system operator, is allowed to access the system interface 105 at a time. Therefore, a program or application should allocate the system interface 105 for its use before using it, and then deallocate the interface 105 when its operation is complete. The CSR 209 indicates which client or operator is allocated access to the system interface 105 at a particular time.

For example, in one embodiment, the last three bits of the CSR register are used to indicate whether a client is using (has control) of the system interface 105. Thus, the last three bits identify whether the interface is available or who has control of the interface. Whether someone has control of the system interface 105 can be determined by simply reading the CSR register.

When using the CSR as a command register, the client writes an 8-bit command to the CSR register. In one embodiment, the commands are:

Allocate: The first command in a sequence of commands. This command clears both request register 203 and response register 205. The allocate command can only be successfully accomplished if the interface 105 is not presently allocated to another client.

Deallocate: The last command in a sequence of commands. This command clears the "done" bit and the "interface owner ID" fields in the CSR status register.

Enable Interrupts: This enables the interface 105 to send interrupts to the ISA bus.

Disable Interrupts: This command disables the interface 105 from sending interrupts to the ISA bus.

Message: This command informs the interface 105 that a command to be transmitted over the I$^2$C bus has been placed in the request buffer 203.

Clear Done: This command clears the done bit and the CSR status register.

Clear Interrupt

This command clears the interrupt request bit in the CSR status register.

Request: This command should be executed after receiving an interrupt in order to turn off the hardware interrupt request.

Reset: This command unconditionally clears all bits in the CSR status register except the "event indication" bit. This command aborts any currently in progress message operation and clears any interrupt.

In one embodiment, the 8-bit CSR status register has the following format:
bit 7 (error indication)
bit 6 (interrupt enable)
bit 5 (event indication)
bit 4 (command done)
bit (interrupt request)
bit 2-0 (interface owner identification).

Figures 3, 3A:
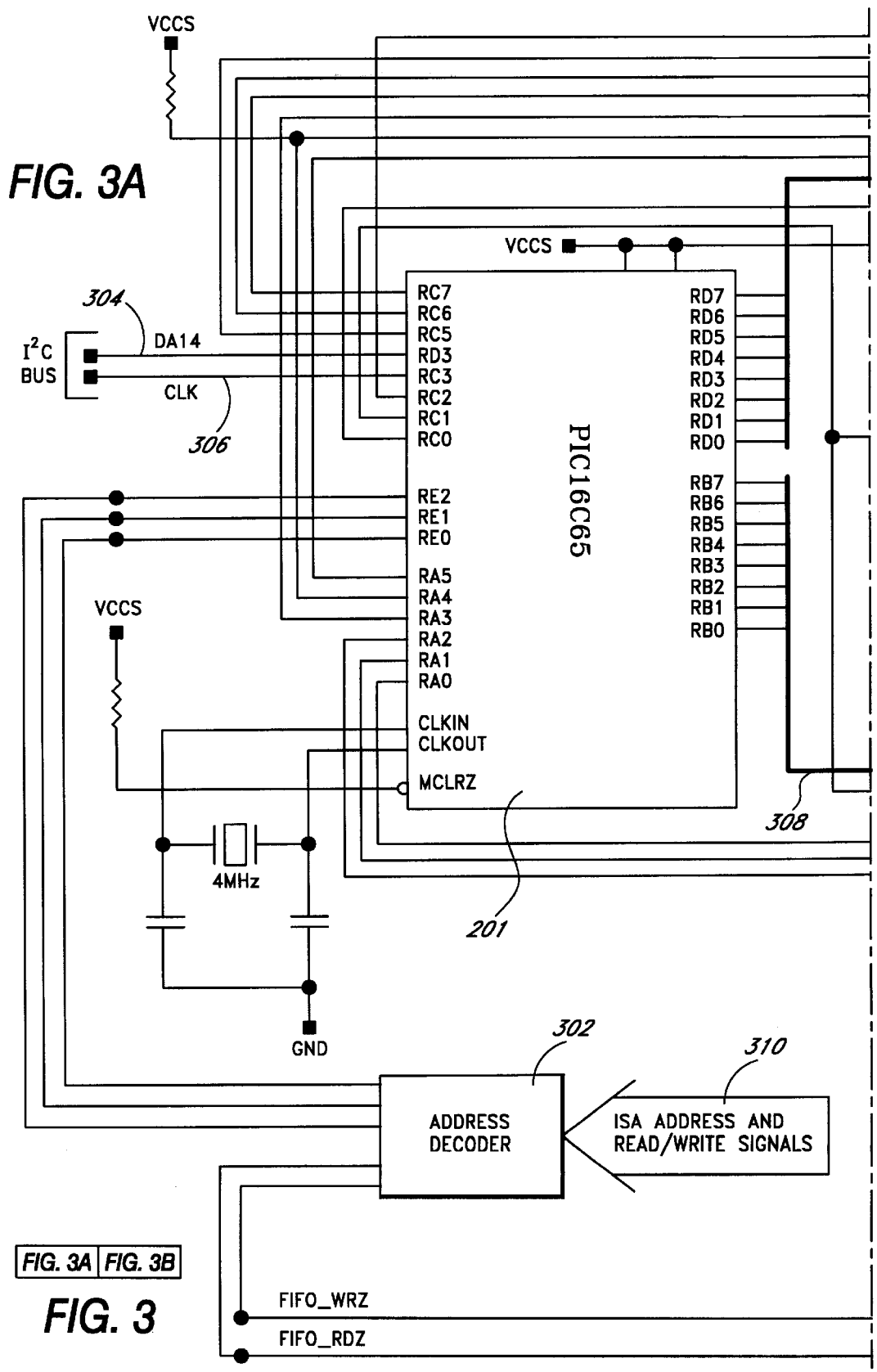
FIG. 3 is a circuit diagram of an embodiment of the system interface depicted in FIG. 2.
Figure 3B:
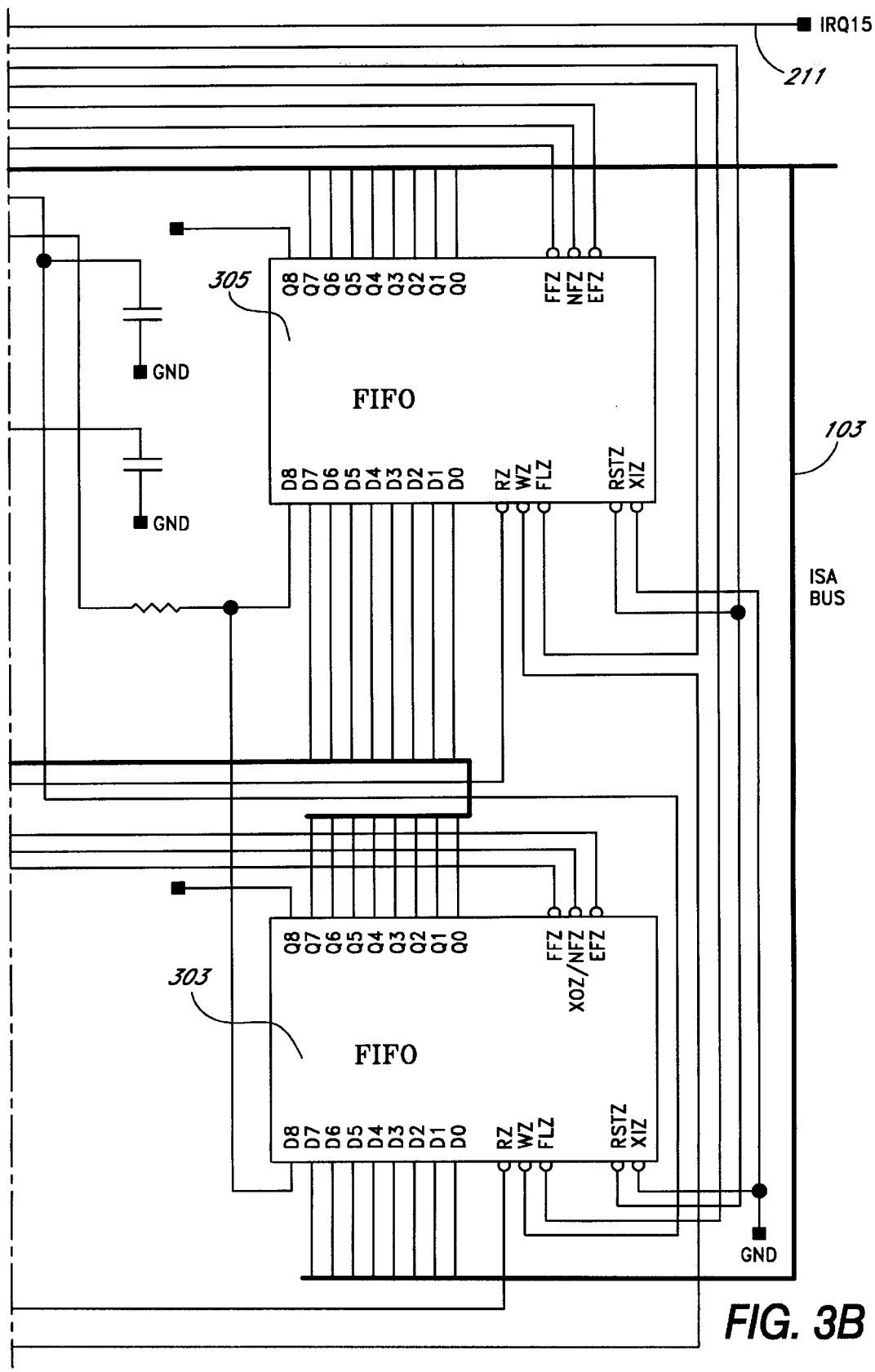

Turning now to FIG. 3, a detailed description of one embodiment of the circuit of the system interface 105 (FIG. 2) will be provided. Generally speaking, the system interface 105 may include system interface processor 201 (in one embodiment a PIC16C65 microcontroller manufactured by Microchip Technologies, Inc is used), request buffer 303 in the form of a FIFO memory chip, response buffer 305, also in the form of a FIFO memory chip, and address decoder 302. The system interface processor 201 is coupled to the data line 304 and the clock line 306 of the I²C bus. The system interface processor 201 is also coupled to the ISA bus via data lines RD 0–7. That interface to the ISA bus corresponds to CSR 209 in FIG. 2. System interface processor 201 is also coupled to request buffer 303 and response buffer 305 via lines RB0 through RB7 indicated at 308. Output RC2 of system interface processor 201 is coupled to interrupt line IRQ 15 of the ISA bus 103.

Request buffer 303 has its output from lines D0–7 coupled to the ISA bus. Response register 305 has its input lines Q7–Q0 coupled to the ISA bus. This allows for data to be received from the ISA bus by the request buffer 303 and data to be sent to the ISA bus from the request buffer 305. Data is sent, or read from, the request buffer 303 by the system interface processor 201 over the lines indicated at 308 discussed above. Similarly, data is sent from the system interface processor 201 to the response buffer 305 also over lines indicated as 308.

The system interface processor 201, request buffer 303 and response buffer 305 are read from over the ISA bus or are written to over the ISA bus according to ISA address and read/write signals which may include timing and enable signals generally indicated as 310. Address decoder 302 generates a write signal for request buffer 303, a read signal for response buffer 305 and both read and write and enable signals for system interface processor 201 in response to the ISA address and read/write signals 310. Specifically, when ISA address 0CC0H is present at the address decoder and an ISA write signal is present, data is received by (or written to) request buffer 303. In response to ISA address 0CC0H and a read signal, address decoder 302 generates the read signal for response buffer 305 which allows data to be read from that buffer by the ISA bus. When ISA address 0CC1H is present and a read signal is also present, address decoder 302 sends the enable and read signals to signal interface processor 201 which enables data to be read at the ports represented by lines R0–7 in the system interface processor 201. Finally, when ISA address 0CC1H and a write signal are present, address decoder 302 generates the write and the enable signals for system interface processor 201 which enables data to be written over the ISA bus to the system interface processor 201 at lines RD0–7.

Figure 4A:
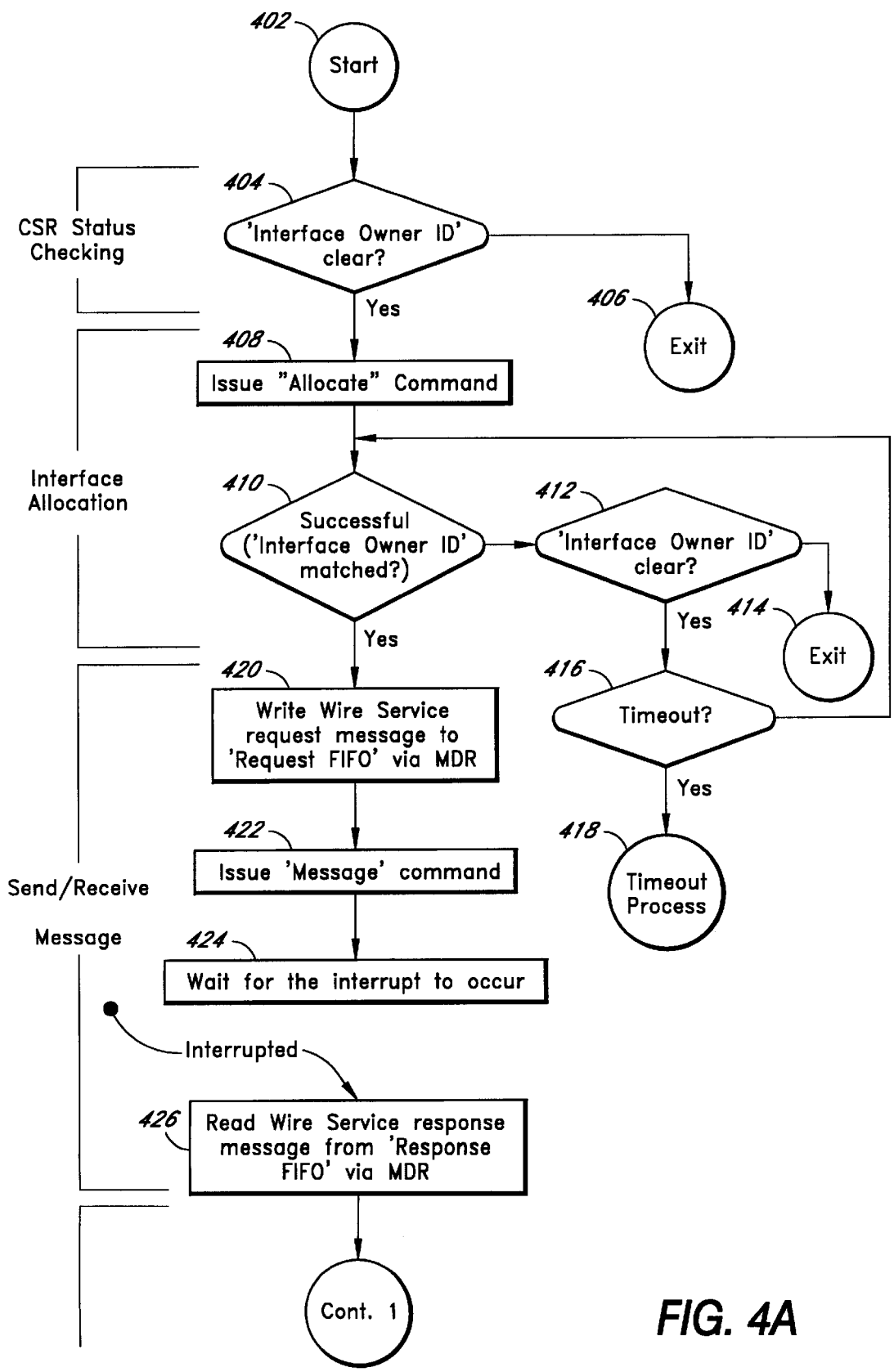
FIGS. 4A and 4B are flow charts depicting the process followed in one embodiment of the invention in connection with transmitting a message through the system interface.
Figure 4B:
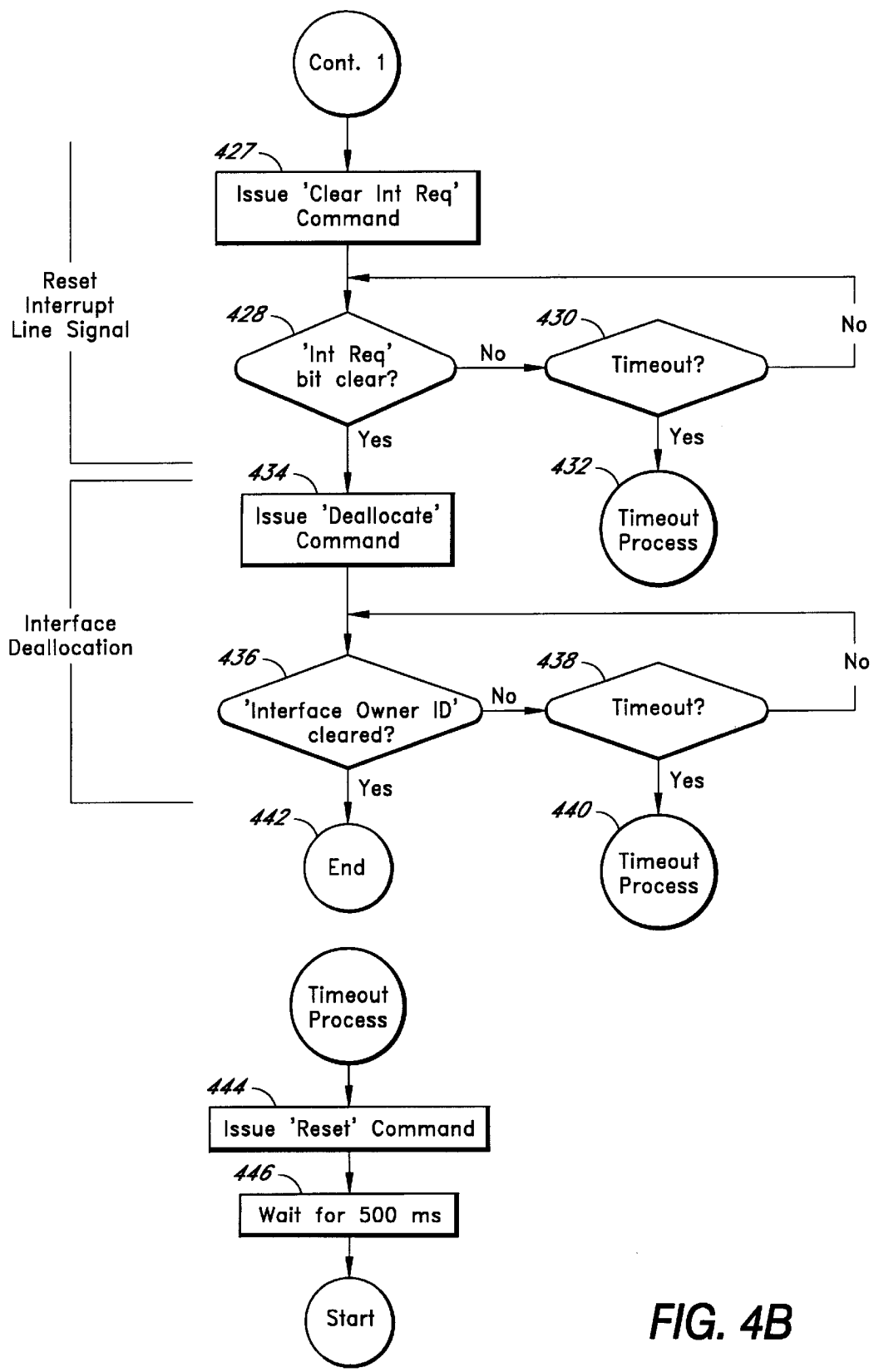

Turning now to FIGS. 4A and 4B, the process followed in one embodiment by a client in connection with transmitting a message through the interface 105 to a device on the I²C bus, the message operation, will be described. The flowcharts represent the steps which are accomplished in one embodiment by software operating within the computer system. In one embodiment, the software which accomplishes these steps is in the form of a driver routing operating in CPU 101 (FIG. 1) that is discussed below with regard to FIGS. 7A–C.

Referring first to FIG. 4A, the process begins with step 404. At step 404, the client reads the CSR status register 209 (FIG. 2) to determine whether the interface owner ID is cleared. This indicates whether another client has control of the interface 105. If the interface owner ID is not clear, as indicated by circle 406, the process stops. If the interface owner ID is clear, the process continues to step 408 where the client issues the allocate command to attempt to take control of the interface 105.

Next, at step 410, the client determines whether its allocate command was successful by again reading the CSR status register and then determining whether its own identification now appears in the interface owner ID portion of the status register. If that has not occurred, the process continues to step 412. If the interface owner ID is not clear, indicating that a different client has gained control of the interface, the process then ends at step 414. If the interface owner ID is clear, the process continues to step 416, wherein the client can either return to step 410 and again read the status register to determine if its own ID is present, or it can continue on to the timeout process indicated by circle 418 and which is described below in more detail with reference to FIG. 4B.

If at step 410 the allocate command is successful and the client's ID is then read from the status register, the process continues to step 420. At this step, the client has successfully taken control of interface 105.

As described above, the allocate command, when successful, clears both the request buffer and the response buffer. Therefore, at step 420, the client now writes the request message to the request buffer 203. Next, at step 422, the client writes the "message" command to the command status register. Receipt of the "message" command by the interface 105 causes the interface to begin processing the information in the request buffer 203. Next, at step 424, the client waits for an interrupt issued by the interface 105. The interface 105 issues the interrupt once it has received a response to the "message" command from the ultimate recipient or I²C bus. When the interrupt is issued, the client then reads the response buffer 205 as indicated at step 426.

Continuing now to FIG. 4B, the process continues to the step represented by box 427 where the client issues the clear interrupt request command. As was described above, the clear interrupt request command turns off the interrupt generated by the interface 105. Next, at step 428, the client then reads the command status register to determine whether the interrupt request bit has been cleared which indicates that the clear interrupt request command has been successful. If the interrupt request bit in the command status register has not been cleared, the process continues to step 430. At step 430, the client either proceeds to the timeout process represented by circle 432 or returns to repeat step 428. Once the interrupt request bit has been cleared, the process continues on to step 434.

At step 434 the client issues the deallocate command in order to release control of the interface 105. Next at step 436, the client reads the command status register to determine if the interface owner ID has been cleared which indicates that the deallocate command has been successful. If the interface owner ID has not been cleared, the process continues to step 438 wherein the client either proceeds to repeat step 436 or proceeds to the timeout process as represented by circle 440.

If at step 436 the client determines that the interface owner ID has been cleared, the process continues is completed as indicated at step 442 once.

Referring to the bottom of FIG. 4B, the timeout process referred to above will now be described. At step 444 client issues the reset command which clears all the bits in the command status register except for the event bit and aborts any in progress message operation and clears any current interrupts. Next, at step 446, the client goes into a wait state. In some embodiments the unit state may be for 500 microseconds. This wait state provides time for the buffers 203 and 205 to clear. Finally, the process returns to the start of the process 402 in FIG. 4A.

Figure 5A:
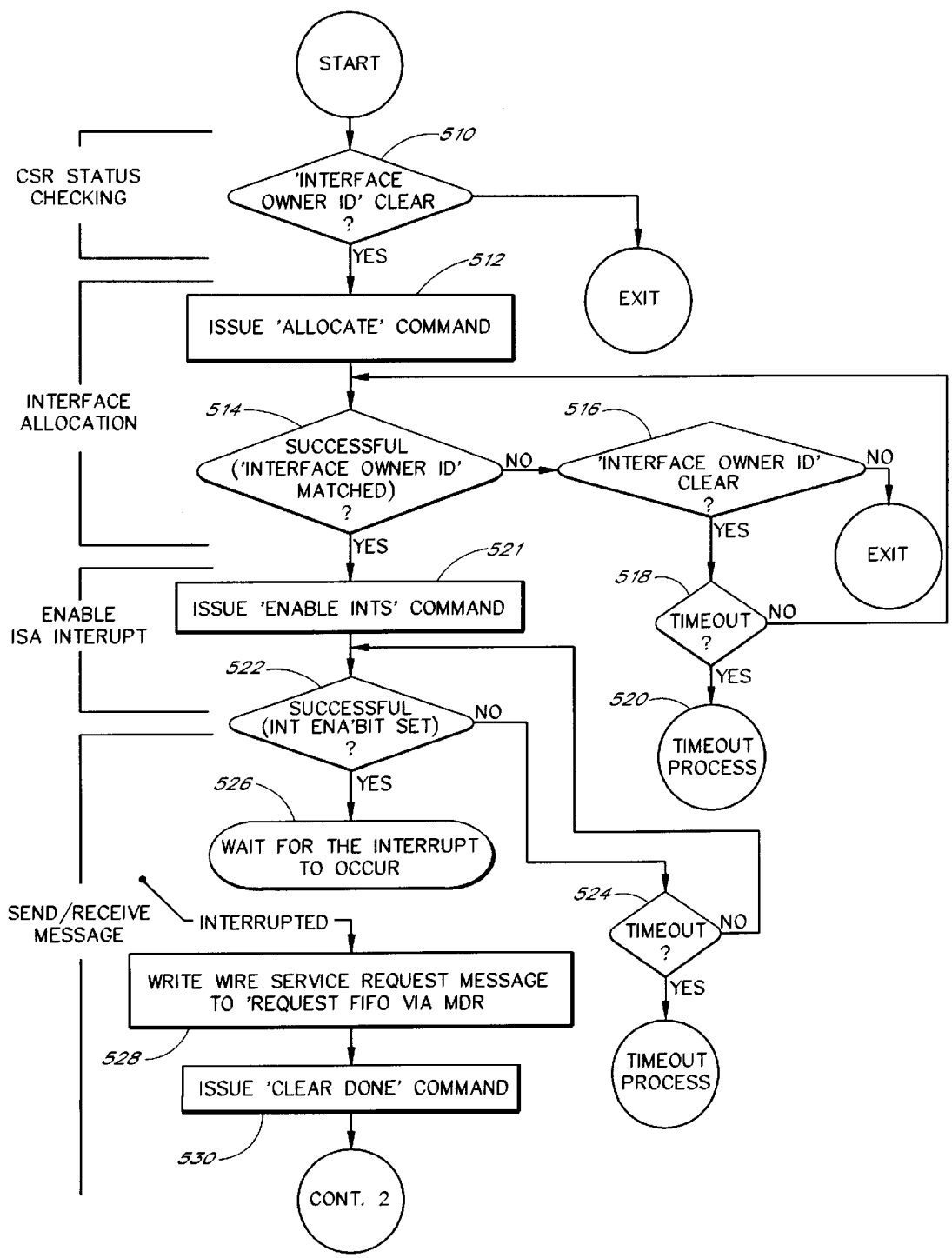
FIGS. 5A and 5B are flow charts depicting the process for one embodiment of the invention wherein a client monitors the system interface for events.
Figure 5B:
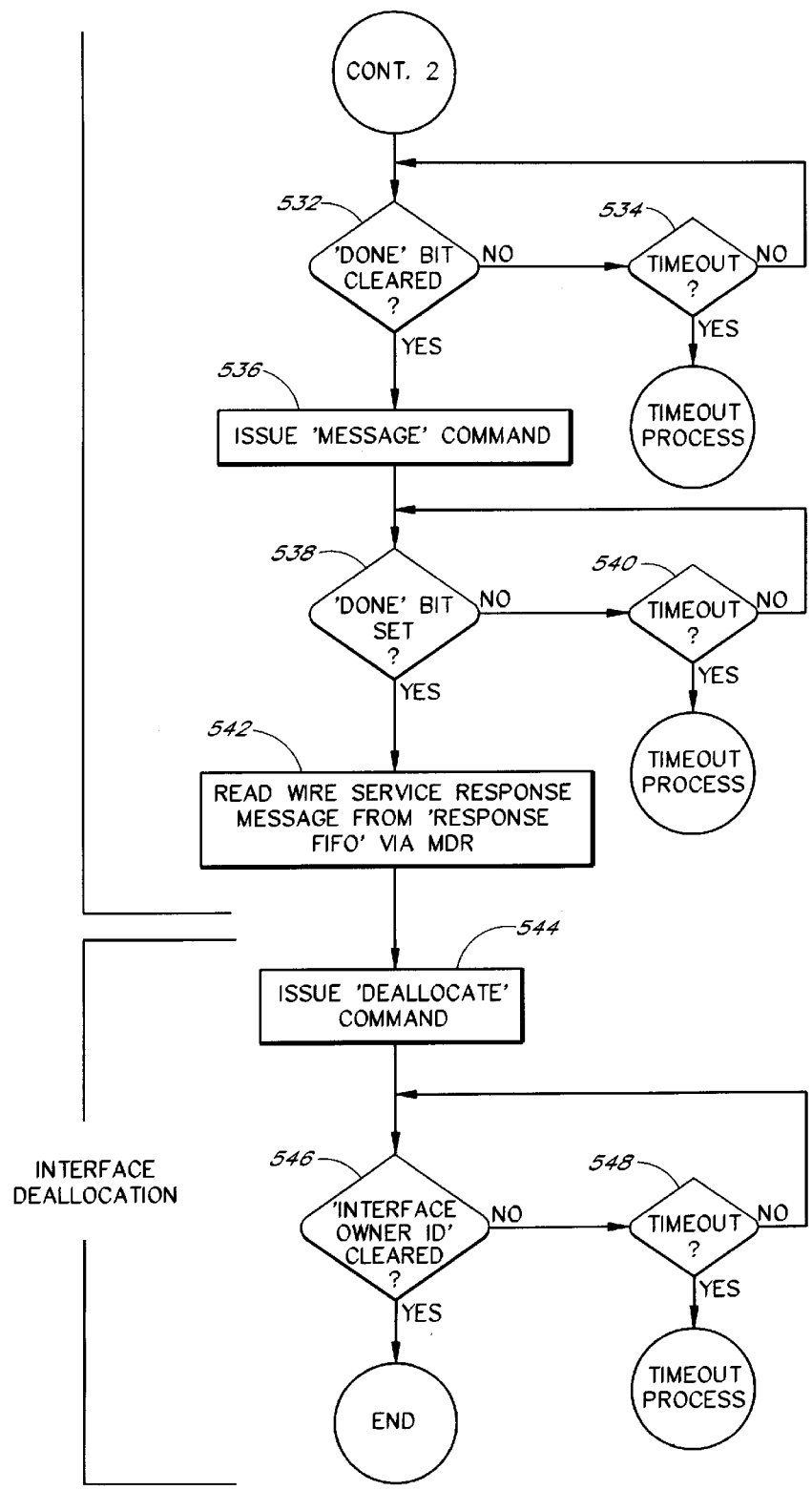

Turning now to FIGS. 5A and 5B, the process for one embodiment wherein the client monitors the interface for events which are reported by the microcontrollers on the I²C bus will be described. This process is useful in systems in which the devices on the I²C bus monitor certain parameters of the system such as temperature. The flowcharts represent the steps which are accomplished by software operating within the computer system.

First, at decision block 510 in FIG. 5A, the client reads the CSR status register to determine whether the interface owner ID is cleared. This indicates whether any client has control of the interface 105 at this time. If the interface ID is not clear, meaning a client has control of the interface, the process is exited. If the interface owner ID is clear, the process continues on to step 512. At step 512 the client issues the allocate command which clears the request and response buffers and writes the client's identification into the interface owner ID in the CSR status register. At step 514, the client determines whether its allocate command was successful by again reading the CSR status register and then determining whether its own identification now appears in the interface owner ID portion of the status register. If the command was not successful, the process continues to the step represented by decision block 516. At decision block 516, if the interface owner ID is not clear, the process stops. If it is clear, the process continues to step 518.

At step 518 the system can either go into a timeout process which is previously the same as that described with reference to FIG. 4B or the process can return to step 514.

Once the client has successfully taken control or ownership of the interface 105 at step 514, the process continues to the step represented by box 521. At this step, the client issues the enable interrupts command writing that command to the CSR. This command enables the interface 105 to issue an interrupt over line ISA IRQ 15.

Next, at decision block 522, the client reads the CSR status register to determine whether the interrupt enable bit was successfully set. If the interrupt enable bit was not successfully set, the process continues to step 524 wherein the client either continues to the timeout process described previously or returns to step 522.

Once the enable bit has been successfully set at step 522, the process continues to step 526 where it wait for an interrupt to be generated by interface 105.

When an interrupt is generated on the ISA bus by the interface 105 (FIG. 2), the process proceeds to step 528 wherein the client writes a request message to the request buffer. Next, at step 530 the client issues the clear done command described above. Recall that this command clears the done bit in the CSR status register. The process then continues to step 532 as will be described with reference to FIG. 5B.

At step 532, the client reads the CSR status register to determine if the done bit was successfully cleared. If it was not successfully cleared, the process continues to decision block 534 where the client either goes to the timeout process described previously or repeats the step represented by decision block 532. Once the done bit has been successfully cleared, the process continues to step 536. At step 536, the client issues the message command which, as described above, causes the interface 105 to place the message which caused the interrupt onto the response buffer 205 (FIG. 2). Once this has been accomplished, the done bit is set by the interface 105.

Next, at decision block 538, the client reads the CSR status register to determine whether the done bit has been set. If the done bit has not been set, as the process continues to step 540, wherein the client either proceeds to the timeout process as described above or repeats the step represented by decision block 538.

Once the done bit has been set, the process continues to step 542. At step 542 the client reads the message which has been written to the response buffer 205 by the interface 105. Next, step at 544, the client issues the deallocate command which relinquishes control of the interface the details of which were described previously.

Next, at step 546, the client confirms that the interface owner ID was successfully cleared by the deallocate command. If the interface owner ID in the command status register was not successfully cleared, the process proceeds to decision block 548 wherein the client either goes to the timeout process or repeats step 546. Once the interface owner ID is successfully cleared, the process is completed.

Figure 6A:
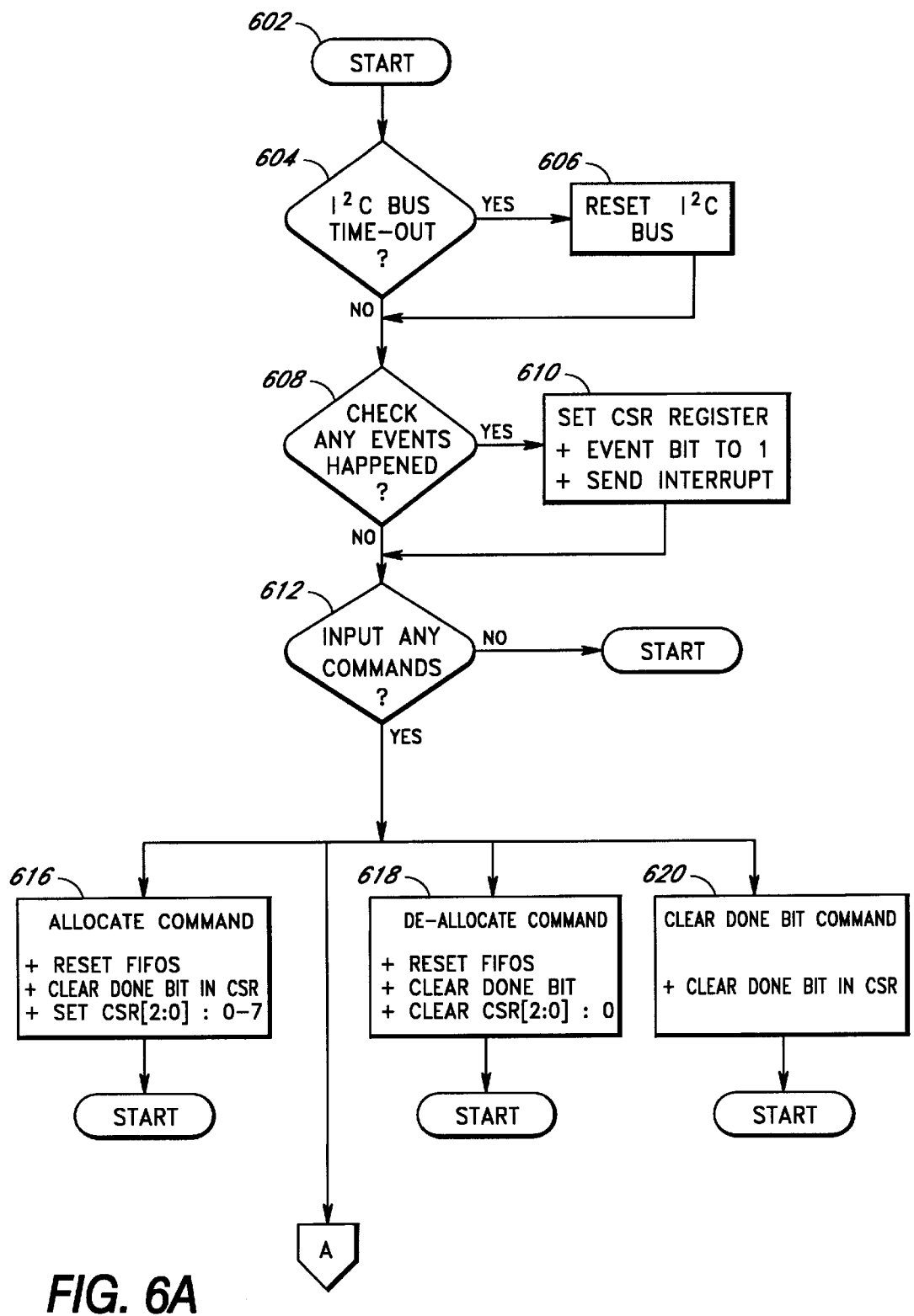
FIGS. 6A and 6B are flow charts depicting the process for one embodiment of the invention wherein the system interface responds to requests from devices on the two buses.
Figure 6B:
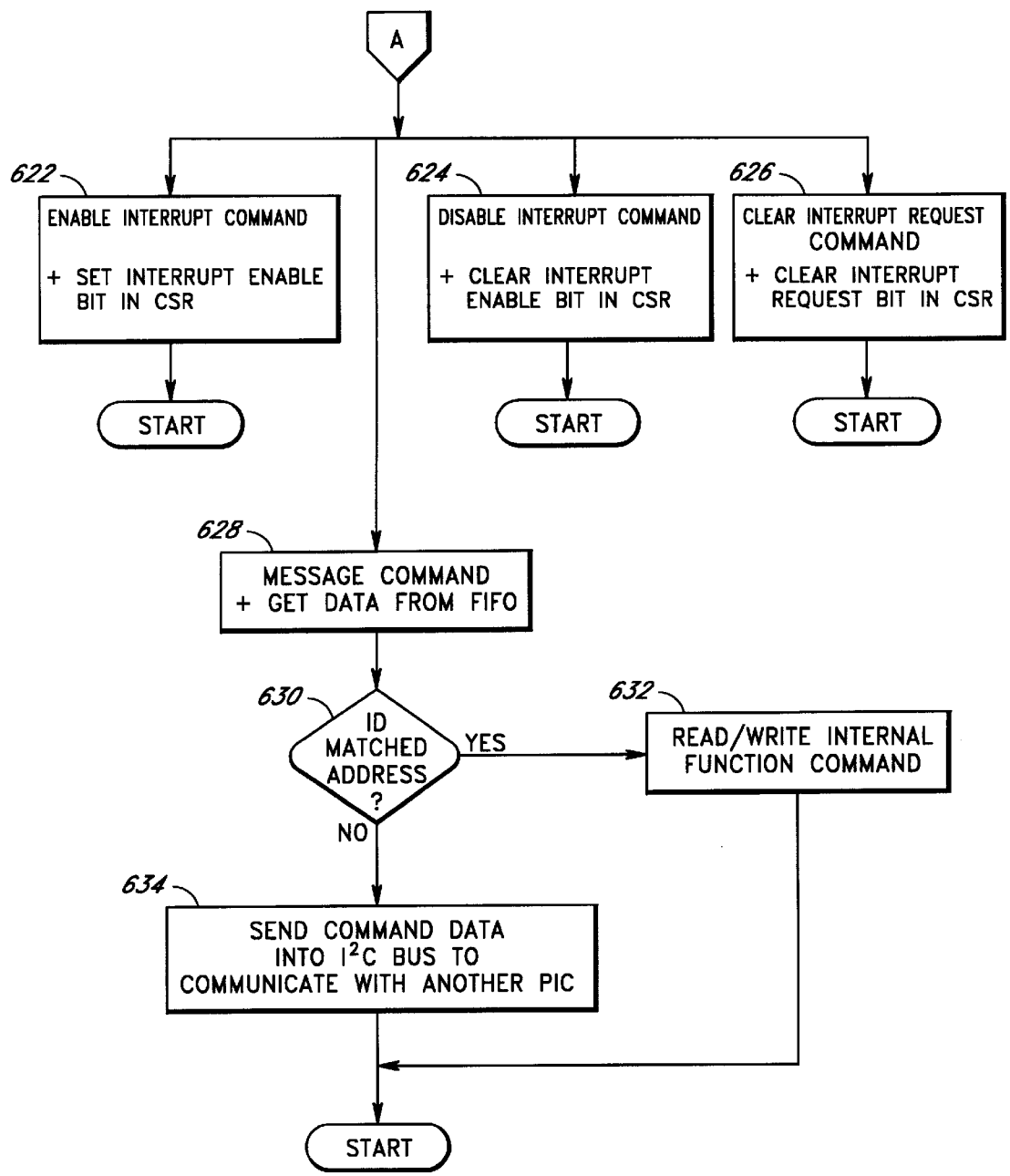

The process by which the system interface 105 handles requests from other microcontrollers on the I²C bus 107 and clients on the ISA bus 103 (FIG. 2) will now be described. The flowcharts in FIGS. 6A and 6B represent the steps or actions which are accomplished in one embodiment by firmware or software operating within the interface processor 201.

Beginning with step 604, the system interface 105 determines whether the I²C bus 107 has timed-out. If the bus has timed-out, then the process proceeds to step 606 wherein the system interface 105 resets the I²C bus 107.

If the I²C bus has not timed out, the process continues to step 608 wherein the system interface 105 determines whether any events have occurred. An event occurs when the system interface 105 receives information from another microcontroller over the I²C bus. If an event has occurred, the process continues to step 610 wherein the system interface 105 sets the CSR register event bit to one. The system interface 105 also sends an interrupt to the ISA bus if the interrupt is enabled.

The process continues to step 612 from step 610 or proceeds directly to step 612 from step 608 if no event has occurred. At step 612 the system interface 105 check to see if a command has been received in the CSR register 209 (FIG. 2). If the system interface 105 does not find a command, then the process returns to start 602. Otherwise, if the system interface finds a command, then the system interface starts to parse the command and as represented by steps 616–628.

If the "allocate" command is present, the process continues to step 616 wherein the system interface 105 resets (clears) the response and request buffers 203, 205 and resets the done bit in the CSR. The system interface also sets the CSR Interface Owner ID. The Owner ID bits identify which client has control of the system interface 105. The process then returns to start 602.

If the "de-allocate" command is present at step 612, the process continues to step 618 wherein the system interface 105 clears the response and request buffers 203, 205, resets the done bit in the CSR and clears the Owner ID bits. The process then returns to start 602.

If the "clear done bit" command is present at step 612, the process continues to step 620 wherein the system interface 105 clears the done bit in the CSR. The process then returns to start 602.

Figure 7A:
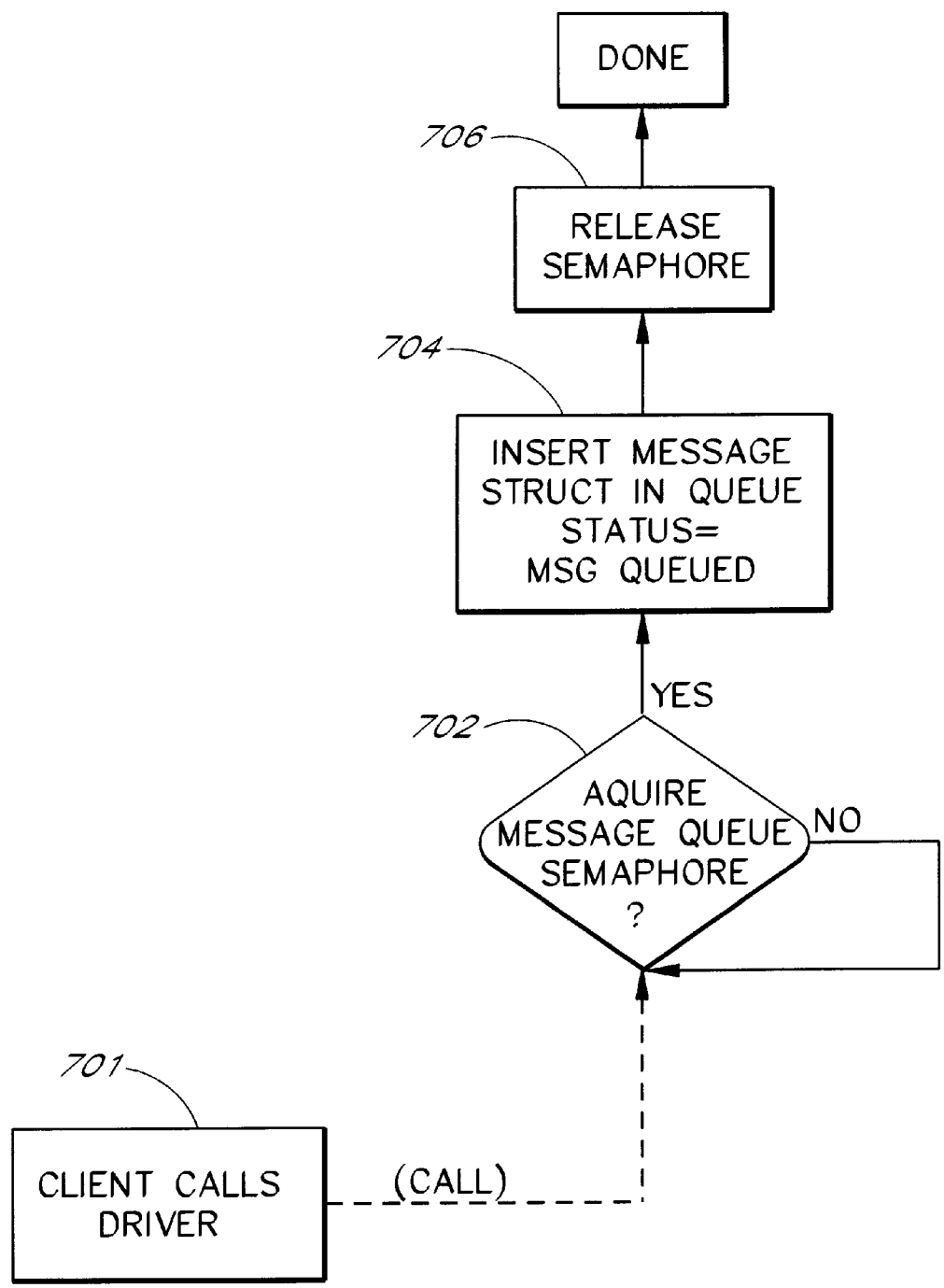
FIGS. 7A, 7B and 7C are flow charts depicting the process carried out by a driver for communicating across the interface.
Figure 7B:
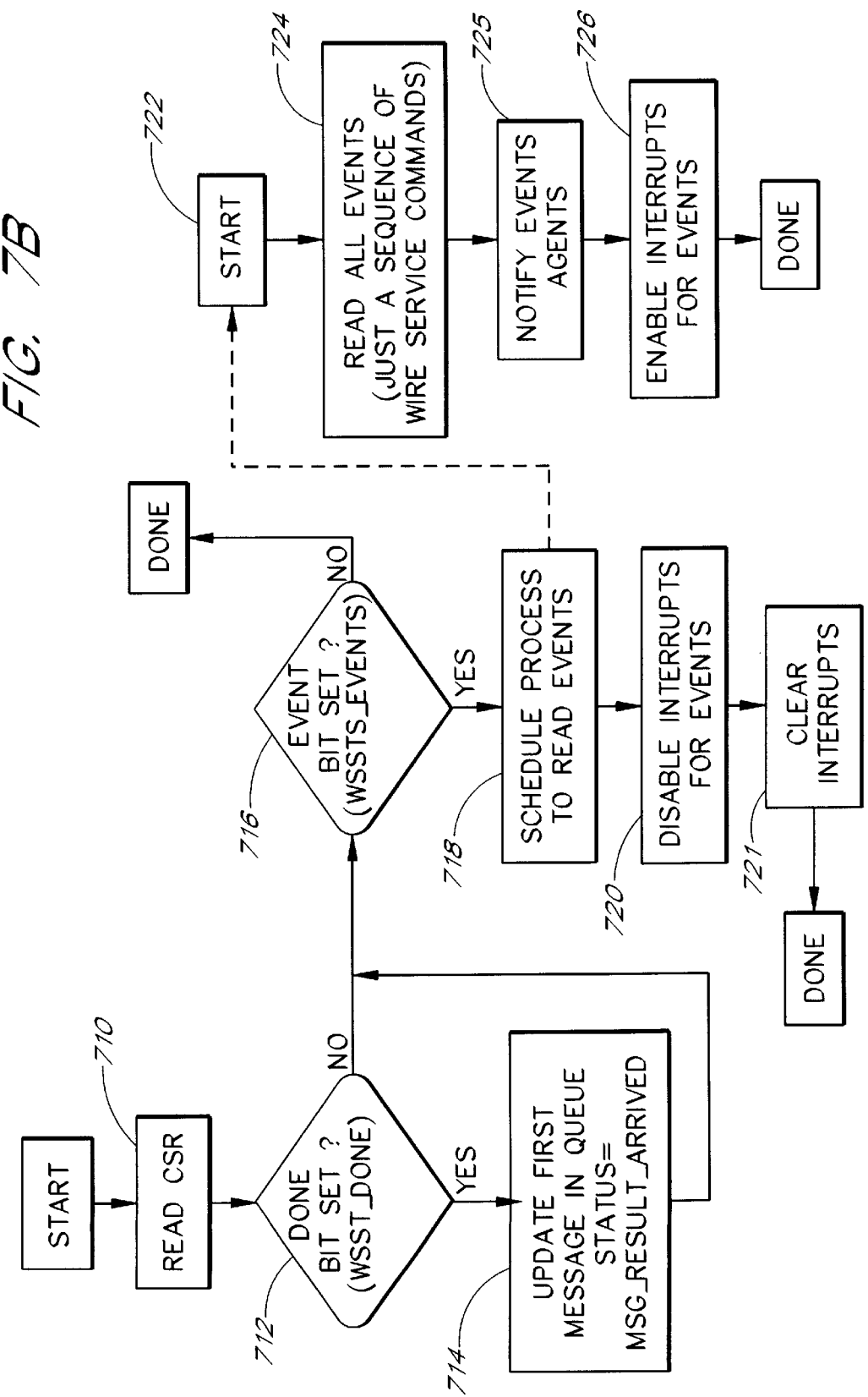

Referring now to FIG. 7B, if the "enable interrupt command" is present at step 612, the process continues to step 622. At step 622 the system interface 105 sets the interrupt enable bit in the CSR. The process then returns to start 602.

If the "disable interrupt" command is present at step 612, the process continues to step 624, wherein the system interface 105 clears the interrupt enable bit in the CSR. The process then returns to start 602 (FIG. 6A).

If the "clear interrupt request" command is present at step 612, the process continues to step 626, wherein, the system interface 105 clears the interrupt request bit in the CSR. The process then returns to start 602 (FIG. 6A).

If the "message" command is present at step 612, the process continues to step 628. At step 628, in response to the message command, the system interface 105 reads data from the request buffer 203 (FIG. 2). The first data read from the request buffer by the interface I$^2$C is the ID (address) of the microcontroller for which the message in the request buffer is intended. Next, at step 630 the interface determines whether the ID is its own. If it is, the process continues to step 632 wherein the interface itself responds to the message and then returns to start 602 in FIG. 6A.

If it is determined at step 630 that the ID is not that of the interface, the process continues to step 634 wherein the message is sent over the I$^2$C bus to the appropriated device. The process then returns to start 602 in FIG. 6A.

Figure 7C:
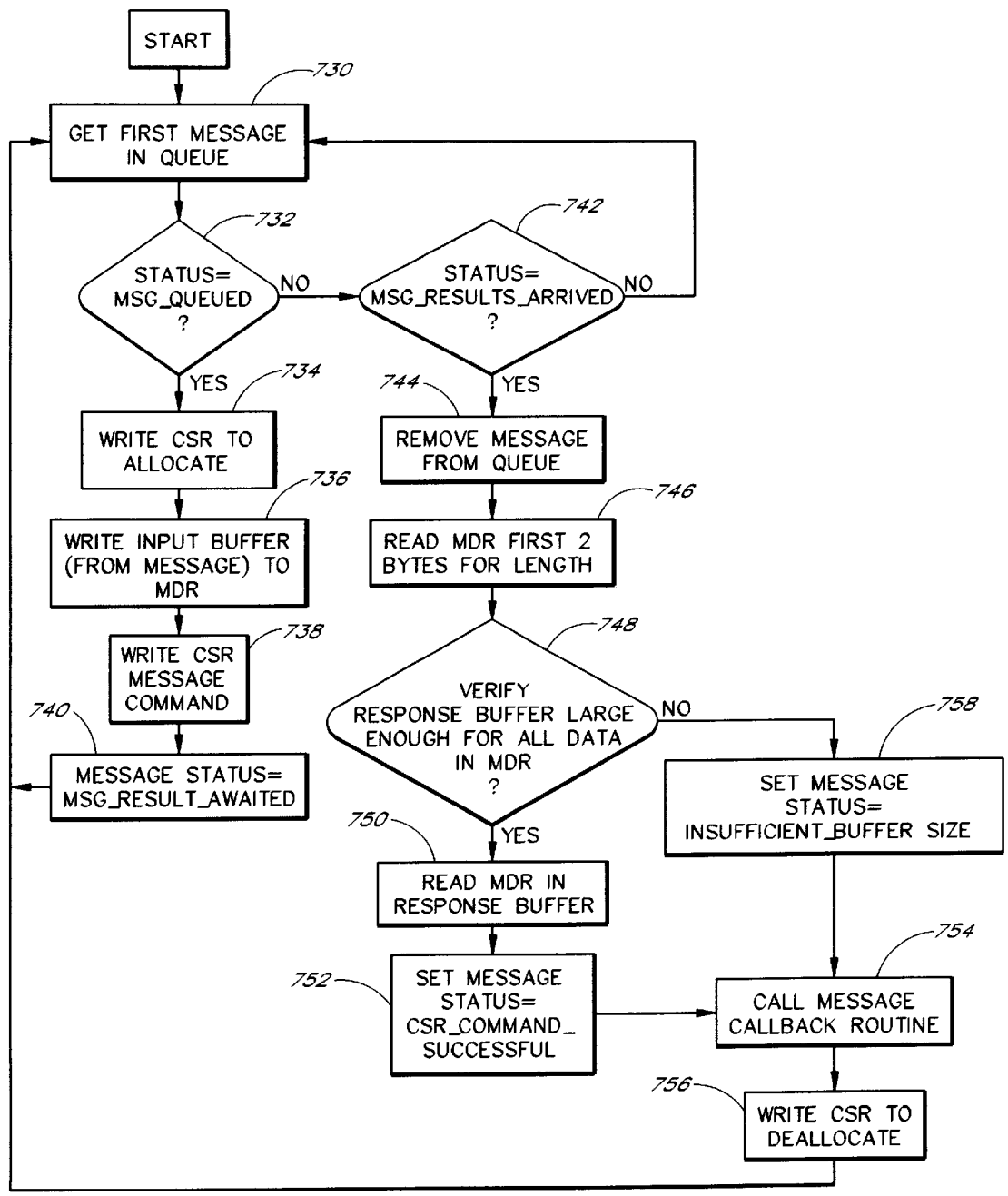

Referring now to FIGS. 7A–C, an interface driver will be described, which in one embodiment operates in CPU 101 (FIG. 1) to permit other software programs (clients) to access the interface 105. The driver has three aspects: message queuing (FIG. 7A), interrupt processing (FIG. 7B), and message processing (FIG. 7C). Each of these aspects will be described with reference to the figures.

Referring first to FIG. 7A, the message queuing process will be described. The message queuing process is initiated by a call from a client as indicated at step 701. The message queuing process then begins at step 702, wherein the driver attempts to acquire the message queue semaphore. The message queue semaphore is used to avoid multiple simultaneous access to the message queue. Once the message queue semaphore has been acquired, the process continues to step 704 wherein the driver inserts the message from the client into the message queue and changes its status flag to indicate that a message has been queued. The client can transmit to the driver the actual message, or merely a pointer to a buffer containing the message. The message may include a pointer to a memory location where a response message can be written. Next, at step 706, the message semaphore is released. This process is repeated every time a client call the driver to queue a message.

Turning next to FIG. 7B, the processing by the driver of interrupts generated by the interface 105 will be described. The process begins after an interrupt has been transmitted to the ISA bus by the interface 105. Starting at step 710 the driver reads the CSR register 209 (see FIG. 2). Next, at step 712, the driver determines whether the "done bit" in the status register is set. This provides a first indication of whether the interrupt indicates that a response to a message has arrived at the interface or whether the interrupt indicates that an event has occurred. If the done bit is set, the process then continues to step 714. At step 714, the driver, in response to the done bit being set, changes the status flag associated with the message to indicate that a message has arrived. The use of this flag is described more fully below with reference to FIG. 7C. The processing then continues on to step 716.

If at step 712 it is determined that the done bit is not set, the process bypasses step 714 and proceeds directly to step 716. At step 716, the driver determines whether the event bit in the status register is set. If the event bit is not set, the interrupt processing is complete. However, if the event bit is set, indicating that an event has occurred, the process continues to step 718. At step 718 the driver schedules a process to read event information. That process will be described in further detail below with reference to blocks 722–726. Next, at step 720 the driver disables the event interrupt by writing the disable interrupts command to the CSR. Then, at step 721 the driver clears the interrupt by writing the clear interrupt command to the CSR which clears the interrupt request bit in the CSR status register.

As noted above, at step 718, the driver initiates the process which includes steps 722–726. Starting at step 722, the driver initiates a process or thread which is treated by the message insertion process, described previously with reference to FIG. 7A, as a separate client. At step 724 the process writes a message to the message queue. The particular message may include a query to the devices on the I$^2$C bus to report back the status of any events. Then, at step 725 the driver may notify clients that have registered for notification of the particular event. Such a registry may be maintained by the driver or by another program. Next, at step 726 the process re-enables the event interrupts by writing the enable interrupts command to the CSR. That completes the process.

Referring to FIG. 7C, the process by which the driver processes messages in the message queue will be described. First, at step 730, the driver gets the first message in the queue. If no messages are in the queue, the driver waits until a message is queued. Once the driver has obtained the first message in the queue, it proceeds to step 732. At step 732, the driver determines whether the status of the message is "message queued". If it does, the process proceeds to step 734 wherein the driver writes the allocated command to the CSR 209 to obtain allocation of the interface 105. Next, at step 736 the queued message is written to request buffer 203. Then, at step 738 the driver writes the message command to the CSR 209. Next, at step 740 the driver changes the message status to "result awaited". The process then returns to step 730.

If at step 732 the driver determines the message does not have "status queued" associated with it, then the process proceeds to step 742. At step 742 the driver determines whether a message result has arrived as indicated by the status flag associated with the message. Note that the status flag is set by the interrupt processing described previously with reference to step 714 in FIG. 7B. If a message has not arrived, the process returns to step 730. If a message has arrived the process continues to step 744 wherein the message being processed is removed from the queue.

Next, at step 746 the length or size of the response received is determined. In one embodiment, the first two bytes of the response indicate its length. Then, at step 748 the driver verifies that the client has allocated, sufficient space to receive the response. If sufficient space has not been allocated, the process proceeds to step 758 wherein the driver calls the client with a message indicating that an insufficient buffer was allocated for the response and the process continues to step 754 described below.

If sufficient space has been allocated, the process continues to step 750 wherein the response in the response register 205 is written to the memory location allocated by the client for the response. Next, at 752, the message status is set to CSR command successful, indicating that the message has successfully been read.

Next, at step 754 the driver calls the message back routine selected by the client which informs the client that the response has been successfully received. Then, at step 756 the driver deallocates the interface and returns to step 730 to begin processing the next message in the queue.

The invention has been shown and described with respect to particular embodiments. However, it will be understood by those skilled in the art that various changes may be made therein without departing from the spirit and scope of the invention. The scope of the invention is indicated by the appended claims rather than by the foregoing description. All changes which come within the meaning and range of equivalency of the claims are to be embraced within their scope.

Appendix A

Incorporation by Reference of Commonly Owned Applications

The following patent applications, commonly owned and filed Oct. 1, 1997, are hereby incorporated herein in their entirety by reference thereto:

| Title | Application No. | Attorney Docket No. |
|---|---|---|
| "System Architecture for Remote Access and Control of Environmental Management" | 08/942,160 | MNFRAME.002A1 |
| "Method of Remote Access and Control of Environmental Management" | 08/942,215 | MNFRAME.002A2 |
| "System for Independent Powering of Diagnostic Processes on a Computer System" | 08/942,410 | MNFRAME.002A3 |
| "Method of Independent Powering of Diagnostic Processes on a Computer System" | 08/942,320 | MNFRAME.002A4 |
| "Diagnostic and Managing Distributed Processor System" | 08/942,402 | MNFRAME.005A1 |
| "Method for Managing a Distributed Processor System" | 08/942,448 | MNFRAME.005A2 |
| "System for Mapping Environmental Resources to Memory for Program Access" | 08/942,222 | MNFRAME.005A3 |
| "Method for Mapping Environmental Resources to Memory for Program Access" | 08/942,214 | MNFRAME.005A4 |
| "Hot Add of Devices Software Architecture" | 08/942,309 | MNFRAME.006A1 |
| "Method for The Hot Add of Devices" | 08/942,306 | MNFRAME.006A2 |
| "Hot Swap of Devices Software Architecture" | 08/942,311 | MNFRAME.006A3 |
| "Method for The Hot Swap of Devices" | 08/942,457 | MNFRAME.006A4 |
| "Method for the Hot Add of a Network Adapter on a System Including a Dynamically Loaded Adapter Driver" | 08/943,072 | MNFRAME.006A5 |
| "Method for the Hot Add of a Mass Storage Adapter on a System Including a Statically Loaded Adapter Driver" | 08/942,069 | MNFRAME.006A6 |
| "Method for the Hot Add of a Network Adapter on a System Including a Statically Loaded Adapter Driver" | 08/942,465 | MNFRAME.006A7 |
| "Method for the Hot Add of a Mass Storage Adapter on a System Including a Dynamically Loaded Adapter Driver" | 08/962,963 | MNFRAME.006A8 |
| "Method for the Hot Swap of a Network Adapter on a System Including a Dynamically Loaded Adapter Driver" | 08/943,078 | MNFRAME.006A9 |
| "Method for the Hot Swap of a Mass Storage Adapter on a System Including a Statically Loaded Adapter Driver" | 08/942,336 | MNFRAME.006A10 |
| "Method for the Hot Swap of a Network Adapter on a System Including a Statically Loaded Adapter Driver" | 08/942,459 | MNFRAME.006A11 |
| "Method for the Hot Swap of a Mass Storage Adapter on a System Including a Dynamically Loaded Adapter Driver" | 08/942,458 | MNFRAME.006A12 |
| "Method of Performing an Extensive Diagnostic Test in Conjunction with a BIOS Test Routine" | 08/942,463 | MNFRAME.008A |
| "Apparatus for Performing an Extensive Diagnostic Test in Conjunction with a BIOS Test Routine" | 08/942,163 | MNFRAME.009A |
| "Configuration Management Method for Hot Adding and Hot Replacing Devices" | 08/941,268 | MNFRAME.010A |
| "Configuration Management System for Hot Adding and Hot Replacing Devices" | 08/942,408 | MNFRAME.011A |
| "Apparatus for Interfacing Buses" | 08/942,382 | MNFRAME.012A |
| "Computer Fan Speed Control Device" | 08/942,447 | MNFRAME.016A |
| "Computer Fan Speed Control Method" | 08/942,216 | MNFRAME.017A |
| "System for Powering Up and Powering Down a Server" | 08/943,076 | MNFRAME.018A |
| "Method of Powering Up and Powering Down a Server" | 08/943,077 | MNFRAME.019A |
| "System for Resetting a Server" | 08/942,333 | MNFRAME.020A |

-continued

| Title | Application No. | Attorney Docket No. |
|---|---|---|
| "Method of Resetting a Server" | 08/942,405 | MNFRAME.021A |
| "System for Displaying Flight Recorder" | 08/942,070 | MNFRAME.022A |
| "Method of Displaying Flight Recorder" | 08/942,068 | MNFRAME.023A |
| "Synchronous Communication Interface" | 08/943,355 | MNFRAME.024A |
| "Synchronous Communication Emulation" | 08/942,004 | MNFRAME.025A |
| "Software System Facilitating the Replacement or Insertion of Devices in a Computer System" | 08/942,317 | MNFRAME.026A |
| "Method for Facilitating the Replacement or Insertion of Devices in a Computer System" | 08/942,316 | MNFRAME.027A |
| "System Management Graphical User Interface" | 08/943,357 | MNFRAME.028A |
| "Display of System Information" | 08/942,195 | MNFRAME.029A |
| "Data Management System Supporting Hot Plug Operations on a Computer" | 08/942,129 | MNFRAME.030A |
| "Data Management Method Supporting Hot Plug Operations on a Computer" | 08/942,124 | MNFRAME.031A |
| "Alert Configurator and Manager" | 08/942,005 | MNFRAME.032A |
| "Managing Computer System Alerts" | 08/943,356 | MNFRAME.033A |
| "Computer Fan Speed Control System" | 08/940,301 | MNFRAME.034A |
| "Computer Fan Speed Control System Method" | 08/941,267 | MNFRAME.035A |
| "Black Box Recorder for Information System Events" | 08/942,381 | MNFRAME.036A |
| "Method of Recording Information System Events" | 08/942,164 | MNFRAME.037A |
| "Method for Automatically Reporting a System Failure in a Server" | 08/942,168 | MNFRAME.040A |
| "System for Automatically Reporting a System Failure in a Server" | 08/942,384 | MNFRAME.041A |
| "Expansion of PCI Bus Loading Capacity" | 08/942,404 | MNFRAME.042A |
| "Method for Expanding PCI Bus Loading Capacity" | 08/942,223 | MNFRAME.043A |
| "System for Displaying System Status" | 08/942,347 | MNFRAME.044A |
| "Method of Displaying System Status" | 08/942,071 | MNFRAME.045A |
| "Fault Tolerant Computer System" | 08/942,194 | MNFRAME.046A |
| "Method for Hot Swapping of Network Components" | 08/943,044 | MNFRAME.047A |
| "A Method for Communicating a Software Generated Pulse Waveform Between Two Servers in a Network" | 08/942,221 | MNFRAME.048A |
| "A System for Communicating a Software Generated Pulse Waveform Between Two Servers in a Network" | 08/942,409 | MNFRAME.049A |
| "Method for Clustering Software Applications" | 08/942,318 | MNFRAME.050A |
| "System for Clustering Software Applications" | 08/942,411 | MNFRAME.051A |
| "Method for Automatically Configuring a Server after Hot Add of a Device" | 08/942,319 | MNFRAME.052A |
| "System for Automatically Configuring a Server after Hot Add of a Device" | 08/942,331 | MNFRAME.053A |
| "Method of Automatically Configuring and Formatting a Computer System and Installing Software" | 08/942,412 | MNFRAME.054A |
| "System for Automatically Configuring and Formatting a Computer System and Installing Software" | 08/941,955 | MNFRAME.055A |
| "Determining Slot Numbers in a Computer" | 08/942,462 | MNFRAME.056A |
| "System for Detecting Errors in a Network" | 08/942,169 | MNFRAME.058A |
| "Method of Detecting Errors in a Network" | 08/940,302 | MNFRAME.059A |
| "System for Detecting Network Errors" | 08/942,407 | MNFRAME.060A |
| "Method of Detecting Network Errors" | 08/942,573 | MNFRAME.061A |

What is claimed is:

1. A method of controlling the transfer of information between a first bus and clients on a second bus through an interface, comprising:

placing client messages to be transferred across the interface into a queue;

reviewing a status register associated with the interface to determine whether the interface is currently allocated to a client;

if the interface is not currently allocated to a client, then assuming control of the interface;

writing the first message in the queue to a request buffer;

writing a command to the interface to transfer the message in the request buffer to the first bus;

determining whether a message result has arrived in response to the last transmitted message;

transmitting an interrupt to the second bus by the interface;

reading the status register and determining whether the interrupt indicates a response to a message or an event, if the interrupt is in response to a message, reading a response buffer or if the interrupt is in response to an event, placing an event query message into the message queue;

determining the size of the response in the response buffer;

verifying that the client associated with the message being process has allocated sufficient space to receive the response; and writing the contents of the response register to a memory location allocated by the client.

2. The method of claim 1, further including repeating the method for each message placed in the queue.

3. The method of claim 1, further including deallocating the interface.

4. A program storage device storing instructions that when executed by a computer perform the method comprising:

placing client messages to be transferred across the interface into a queue;

reviewing a status register associated with the interface to determine whether the interface is currently allocated to a client;

if the interface is not currently allocated to a client, then assuming control of the interface;

writing the first message in the queue to a request buffer;

writing a command to the interface to transfer the message in the request buffer to the first bus;

determining whether a message result has arrived in response to the last transmitted message;

transmitting an interrupt to the second bus by the interface;

reading the status register and determining whether the interrupt indicates a response to a message or an event, if the interrupt is in response to a message, reading a response buffer or if the interrupt is in response to an event, placing an event query message into the message queue;

determining the size of the response in the response buffer;

verifying that the client associated with the message being process has allocated sufficient space to receive the response; and writing the contents of the response register to a memory location allocated by the client.

5. The program storage device of claim 4, wherein the method further comprises repeating the method for each message placed in the queue.

6. The program storage device of claim 4, wherein the method further comprises deallocating the interface.

* * * * *

UNITED STATES PATENT AND TRADEMARK OFFICE
CERTIFICATE OF CORRECTION

PATENT NO. : 5,987,554

DATED : November 16, 1999

INVENTOR(S): Liu et al.

It is certified that error appears in the above-identified patent and that said Letters Patent is hereby corrected as shown below:

Column 5, line 43, please remove the word "remove" and replace therefore --remote--.

Column 11, line 38, please remove the word "wait" and replace therefore --waits--.

Signed and Sealed this

Seventeenth Day of April, 2001

*Attest:*

NICHOLAS P. GODICI

*Attesting Officer*   *Acting Director of the United States Patent and Trademark Office*